(12) United States Patent
Li et al.

(10) Patent No.: US 8,388,190 B2
(45) Date of Patent: Mar. 5, 2013

(54) ILLUMINATION SYSTEM AND METHOD FOR RECYCLING LIGHT TO INCREASE THE BRIGHTNESS OF THE LIGHT SOURCE

(75) Inventors: Kenneth Li, Castaic, CA (US); Seiji Inatsuju, Santa Monica, CA (US)

(73) Assignee: Wavien, Inc., Valencia, CA (US)

( * ) Notice: Subject to any disclaimer, the term of this patent is extended or adjusted under 35 U.S.C. 154(b) by 0 days.

(21) Appl. No.: 13/150,810

(22) Filed: Jun. 1, 2011

(65) Prior Publication Data
US 2011/0273862 A1 Nov. 10, 2011

Related U.S. Application Data

(63) Continuation of application No. 11/818,308, filed on Jun. 13, 2007, now Pat. No. 7,976,204.

(60) Provisional application No. 60/813,186, filed on Jun. 13, 2006, provisional application No. 60/814,605, filed on Jun. 16, 2006, provisional application No. 60/830,946, filed on Jul. 13, 2006, provisional application No. 60/842,324, filed on Sep. 5, 2006, provisional application No. 60/848,429, filed on Sep. 28, 2006, provisional application No. 60/855,330, filed on Oct. 30, 2006.

(51) Int. Cl.
*F21V 7/00* (2006.01)

(52) U.S. Cl. ......... 362/296.01; 362/296.05; 362/296.07; 362/296.08; 362/310; 362/297

(58) Field of Classification Search .................. 362/551, 362/555, 19, 800, 297–310, 296.01–296.08; 385/146, 11
See application file for complete search history.

(56) References Cited

U.S. PATENT DOCUMENTS

| | | | |
|---|---|---|---|
| 5,005,108 A | 4/1991 | Pristash et al. | |
| 5,142,387 A | 8/1992 | Shikama et al. | |
| 5,982,540 A | 11/1999 | Koike et al. | |
| 6,144,536 A | 11/2000 | Zimmerman et al. | |
| 6,227,682 B1 | 5/2001 | Li | |
| 6,341,876 B1 | 1/2002 | Moss et al. | |
| 6,869,206 B2 | 3/2005 | Zimmerman et al. | |
| 7,052,150 B2 | 5/2006 | Dewald et al. | |
| 7,390,116 B2 | 6/2008 | Jain | |
| 7,494,228 B2 | 2/2009 | Harberg et al. | |
| 2004/0002169 A1 | 1/2004 | Kraus et al. | |
| 2004/0233679 A1 | 11/2004 | Ferri et al. | |
| 2005/0002169 A1 | 1/2005 | Drazic et al. | |
| 2005/0207177 A1 | 9/2005 | Guy | |
| 2006/0008237 A1 | 1/2006 | Imada | |
| 2006/0062013 A1 | 3/2006 | Imada | |
| 2006/0203352 A1 | 9/2006 | Pashley | |
| 2006/0262514 A1 | 11/2006 | Conner et al. | |
| 2007/0236956 A1 | 10/2007 | Kolodin et al. | |

OTHER PUBLICATIONS

Hoepfner, "61.1: Invited Paper: PhlatLightTM Photonic Lattice LEDs for RPTV Light Engineer," SID 06 Digest, 1808-1811 (2006).

*Primary Examiner* — Robert May

(74) *Attorney, Agent, or Firm* — Abelman, Frayne & Schwab

(57) ABSTRACT

An illumination system for increasing the brightness of a light source comprises an optical recycling device coupled to the light source, preferably light emitting diode (LED), for spatially and/or angularly recycling light. The optical recycling device spatially recycles a portion of rays of light emitted by the LED back to the light source using a reflector or mirror and/or angularly recycles high angle rays of light and transmits small angle rays of light, thereby increasing the brightness of the light source's output.

10 Claims, 20 Drawing Sheets

ILLUMINATION SYSTEM AND METHOD FOR RECYCLING LIGHT TO INCREASE THE BRIGHTNESS OF THE LIGHT SOURCE

CROSS-REFERENCE TO RELATED APPLICATIONS

This application is a continuation of application Ser. No. 11/818,308 filed Jun. 13, 2007 now U.S. Pat. No. 7,976,204, which claims the benefit of U.S. Provisional Application Ser. No. 60/813,186, filed Jun. 13, 2006, U.S. Provisional Application Ser. No. 60/814,605, filed Jun. 16, 2006, U.S. Provisional Application Ser. No. 60/830,946, filed Jul. 13, 2006, U.S. Provisional Application Ser. No. 60/842,324, filed Sep. 5, 2006, U.S. Provisional Application Ser. No. 60/848,429, filed Sep. 28, 2006, and U.S. Provisional Application Ser. No. 60/855,330, filed Oct. 30, 2006, each of which is incorporated herein by reference in its entirety. This application is a §371 of PCT/US2006/041592 filed Oct. 25, 2006, and claims priority from U.S. Provisional Patent Application No. 60/730,171 filed Oct. 25, 2005.

BACKGROUND

This invention relates to systems and methods for increasing the brightness of illumination systems, particularly for an illumination system and method that recycles light emitted from a light source in order to increase the brightness of that light source.

Light sources are used in all types of illumination applications. Typical light sources include but are not limited to arc lamps, halogens, fluorescent devices, microwave lamps, and Light Emitting Diodes (LEDs). Many applications require an illumination system with a high level of brightness in a small effective emitting area. This high level of brightness can be accomplished conventionally by adding more light sources. However, this can be both technologically impossible if there is a limited space for integrating light sources and economically unfeasible as it can be expensive to integrate and use multiple light sources. Accordingly, the present invention proceeds upon the desirability of increasing the brightness of a light source without increasing the number of the light source.

For example, microdisplay based television (MDTV) has the potential of being low cost with large screen size. Traditional MDTVs are usually illuminated by arc lamps. Although this light source is the brightest at the lowest cost, the need to split the white light into 3 colors and the short lifetime make it less desirable. With advances in LED technology, the use of LED as the light source in MDTVs has to be considered to capture the long life feature of LEDs and other benefits such as instant ON. However, at the present time, LEDs are not bright enough for low cost application using small imaging panels or with larger screens. LED recycling scheme has been used to enhance the brightness of the light source, see U.S. Pat. No. 6,869,206 issued to Zimmerman et al. However, Zimmerman et al. describes enclosing the LEDs in a light-reflecting cavity with one light output aperture. Also, U.S. Pat. No. 6,144,536 issued to Zimmerman et al. describes a fluorescent lamp having a glass envelope with a phosphor coating enclosing a gas filled hollow interior. A portion of the light generated by the phosphor coating is recycled back to the phosphor coating. The present invention proceeds upon the desirability of providing a recycling device that can be coupled to one or more LEDs to increase the useable brightness of the LED by recycling efficiently such that smaller panels can be used or large screens can be illuminated with sufficient brightness.

For example, LEDs are one type of light source used in many illumination applications such as general lighting, architectural lighting, and more recently in projection televisions. When used in projection televisions for example, LEDs must emit light in a small effective emitting area at a high brightness level in order to provide the requisite high light output on the television screen. Specifically, the LEDs must provide an intense and bright light as measured in lumens at a small and solid angle in a small emitting area to be useful in projection televisions. Unfortunately, the currently available LEDs are not bright enough to be useful in illuminating large projection television screens, which are increasingly popular with the consumer.

Therefore, there is a need for a method and system for increasing the brightness of LEDs so as to provide an illumination system that meets the demands of the current and future applications at a reasonable cost.

SUMMARY OF THE INVENTION

Therefore, it is an object of the present invention to provide an illumination system that solves the aforesaid problems of the prior art.

Another object of the present invention is to provide the illumination system comprising a recycling device to recycle a portion of the light emitted by the light source to increase the brightness of the light output.

A further object of the present invention is to provide the illumination system comprising a spatial recycling device for recycling light by reflecting a portion of the light emitted by the light source back to the light source to increase the brightness of the light output.

A still another object of the present invention is to provide the illumination system comprising an angular recycling device for transmitting small angle light and recycling high angle light to increase the brightness of the light output.

A yet another object of the present invention is to provide the illumination system comprising a spatial and angular recycling device for recycling a portion of the light emitted by the light source to increase the brightness of the light output.

A still yet another object of the present invention is to provide the illumination system as aforesaid, which additionally comprises a polarizer to reflect and recycle the light with undesirable polarization, thereby enhancing the recycling effect of the recycling device.

The present invention is directed to an illumination system that recycles light to increase the brightness of a light source, thereby enabling the illumination system to provide a higher output of light at a reasonable cost. In accordance with an exemplary embodiment of the present invention, the illumination system for recycling light to increase brightness comprises a spatial recycling device. The spatial recycling device comprises a light pipe which is coupled to the light source, preferably a LED chip mounted on a substrate. The spatial recycling device recycles light by covering a portion of the output end of the light pipe with a reflective medium or coating so that the light from the light source is reflected by the reflective medium back into the light source through the light pipe. The light source re-emits the reflected light into the light pipe, thereby increasing the brightness of the light output from the illumination system.

In accordance with an exemplary embodiment of the present invention, the illumination system for recycling light to increase brightness comprises an angular recycling device. The angular recycling device comprises a tapered light pipe coupled to a light source, preferably a LED chip mounted on a substrate. Preferably, the tapered light pipe is decreasingly tapered light pipe where the light pipe tapers from a larger cross-sectional dimension at the input end to a smaller cross-sectional dimension at the output end. The angular recycling device transmits small angle light and reflects large angle light back into the light source. The light source re-emits the reflected light at a different angular distribution, thereby increasing the brightness of the light output.

In accordance with an exemplary embodiment of the present invention, the angular recycling device comprises a decreasingly tapered light pipe coupled to a light source, preferably a LED chip mounted on a substrate, and an increasingly tapered light piped coupled to the output end of the decreasingly tapered light pipe. The decreasingly tapered light pipe tapers from a smaller cross-sectional dimension at the input end to a larger cross-sectional dimension at the output end. The angular recycling device transmits small angle light and reflects large angle light back into the light source, thereby increasing the brightness of the light output.

In accordance with an exemplary embodiment of the present invention, the angular recycling device comprises a lens system coupled to a light source, preferably a LED chip mounted on a substrate. The lens systems comprise a lens surface or lens at the center surrounded by concave reflectors or reflective surfaces. Alternatively, the reflectors can be dual paraboloid reflectors where the high angle rays of light are reflected twice before being focused back onto the LED chip. The reflectors and reflective surfaces reflect the high angle rays of light back into the LED chip for recycling and the lens or lens surface couples the small angle rays of light as light output, thereby increasing the brightness of the light output.

In accordance with an exemplary embodiment of the present invention, an optical recycling device to increase the brightness of a light source comprises a transmission medium for transmitting the plurality of rays of light from the light source. The transmission medium has an output end and input end coupled to the light source. A mirror or reflector is coupled to the output end of the transmission medium for recycling a portion of the plurality of rays of light by reflecting the portion of the plurality of rays of light back to the light source through the input end of the transmission medium to be re-emitted by the light source, thereby increasing the brightness of the light source's output.

In accordance with an exemplary embodiment of the present invention, a method for increasing the brightness of an illumination system comprises the steps of: providing a light source and a light pipe comprising an input end and an output end; the light pipe further comprising a reflective medium disposed on the output end; producing rays of light by the light source; positioning the light pipe so that the input end is substantially proximal to the light source; collecting rays of light at the input end; reflecting a portion of the rays of light by the reflective medium back into the light pipe; coupling the reflected rays of light with light emitted from the light source; outputting the reflected rays of light from the output end of the light pipe, thereby recycling light to increase the brightness of the illumination system.

In accordance with an exemplary embodiment of the present invention, a method for increasing the brightness of an illumination system comprising the steps of: providing a light source and a tapered light pipe having an input end and an output end, wherein the light pipe tapers from a larger cross-sectional dimension at said input end to a smaller cross-sectional dimension at the output end; producing rays of light by the light source; positioning the tapered light pipe so the input end is substantially proximal to the light source; collecting the rays of light at the input end; reflecting a portion of the rays having large angles back into the tapered light pipe decreasing thereby decreasing the angle dimension; outputting small angle light from the output end.

In accordance with an exemplary embodiment of the present invention, a method for increasing the brightness of a light source, comprises the steps of: coupling an optical recycling device to a light source to receive a plurality of rays of light from the light source; recycling a portion of the plurality of rays of light back to the light source; and re-emitting the portion of the plurality of rays of light to the optical recycling device by the light source, thereby increasing the brightness of the light source's output.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which like components or features in the various figures are represented by like reference numbers:

FIG. 11b FIG. 11a is a cross-sectional side view of an illumination system comprising two tapered light pipes, each tapered light pipe coupled at the input end to a LED and at the output end to a same decreasingly tapered light pipe to angularly recycle light in accordance with an exemplary embodiment of the present invention;

DETAILED DESCRIPTION

With reference to the figures, exemplary embodiments of the invention are now described. These embodiments illustrate principles of the invention and should not be construed as limiting the scope of the invention.

Figure 1:
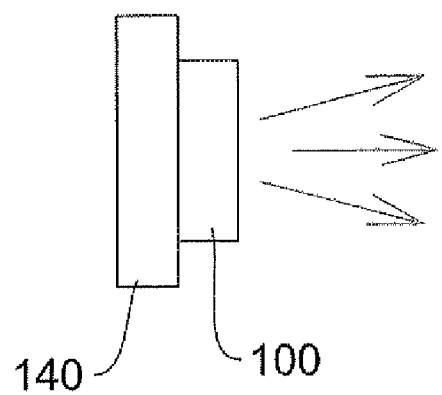
FIG. 1 is a cross-sectional side view of an LED chip mounted on a substrate.
Figure 11A:
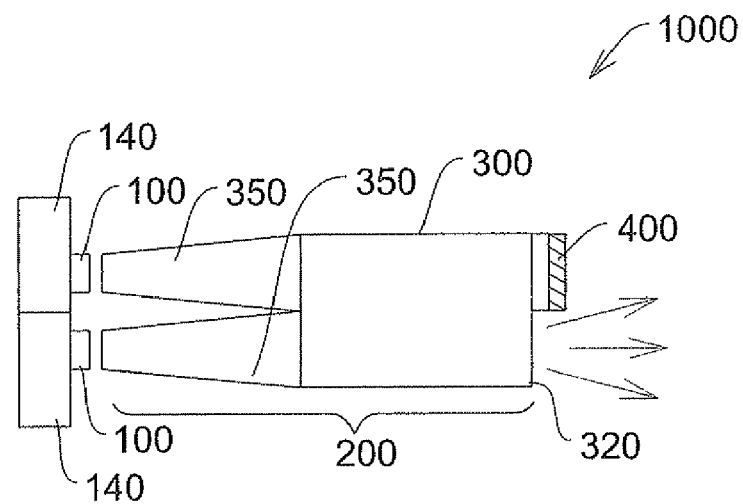
FIG. 11a is a cross-sectional side view of an illumination system comprising two tapered light pipes, each tapered light pipe coupled at the input end to a LED and at the output end to a same straight light pipe having a reflector covering a portion of its output end to spatially recycle light in accordance with an exemplary embodiment of the present invention.
Figure 11B:
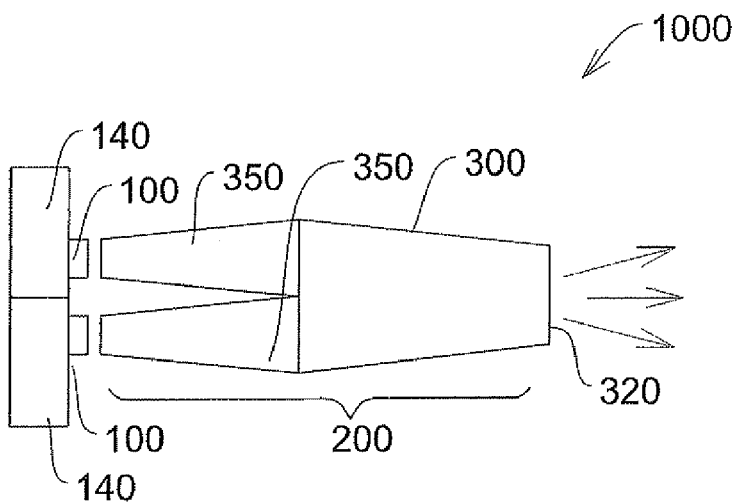
Figure 12:
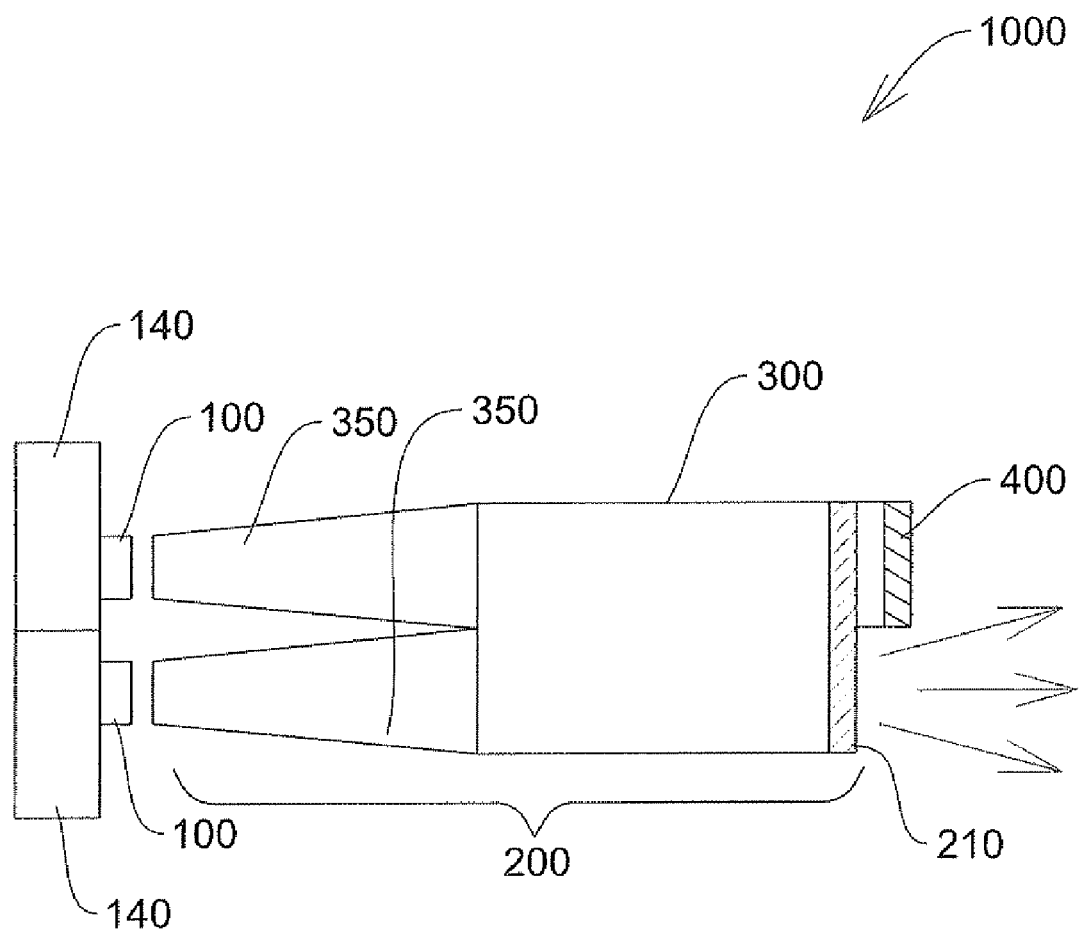
FIG. 12 shows a cross-sectional side view of the illumination system of FIG. 11a additionally comprising a reflective polarizer covering the output end of the straight light pipe in accordance with an exemplary embodiment of the present invention.

In accordance with exemplary embodiments of the present invention, as shown in FIGS. 3-5, 7-18, the illumination system 1000 for recycling light to increase the brightness of the light source comprises a light source 100 and an optical recycling device 200. As shown in FIG. 1, the light source 100 is mounted on a substrate 140. The substrate 140 is preferably though not limited to a heatsink 140 for absorbing and dissipating heat emitted from light source 100. Light source 100 is preferably a light emitting diode ("LED"). The LED or light source 100 can be mounted to the substrate 140 as a bare chip, a chip with a protective coating, or a chip with a lens or collimating lens mounted thereon. The chip size can be as small as less than 1 mm by 1 mm, or as large as technologically feasible. Commercial chips can be as large as 3 to 5 mm in dimension. The dimension of such chips is increasing over time as technology matures. The lens mounted on the LED chip 100 can be spherical in shape or tailored to any shape of the chip to achieve maximum coupling such as aspheric, or a combination of shaped lens for transmission and shaped surfaces for reflection. Although the present illumination system is described using an LED as the light source 100, the light source 100 can be any light source including but not limited to arc lamps, halogen lamps, surface emitting devices (SEDs), fluorescent devices, microwave lamps, and other light sources as understood by those of skill in the art. In accordance with an embodiment of the present invention, as shown in FIGS. 9a-13d and 15a-b, the present system can comprise a plurality of light sources 100 mounted on a single substrate 140. In accordance with an aspect of the present invention, each light source 100 can be mounted on a separate substrate 140 as shown in FIGS. 11a-12.

Figure 2:
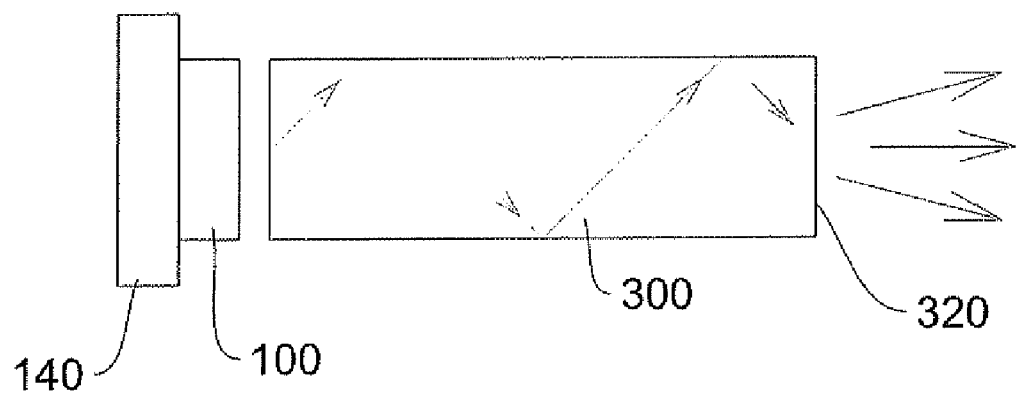
FIG. 2 shows the LED of FIG. 1 coupled to a light pipe.

In accordance with exemplary embodiment of the present invention, the optical device 200 can be a spatial and/or angular recycling device which is in optical communication with light source 100. As described herein, the spatial or angular recycling device 200 generally comprises a light pipe 300 which can be straight or tapered. As shown in FIG. 2, the output of the light source or LED 100 is coupled to the light pipe 300 to provide a uniform intensity profile of the light at the output end 320 of the light pipe 300. The light in the light pipe 300 being guided to the output end 320 through total internal reflection. The output of the LED 100 is captured by the light pipe 300 and transmitted to the output end 320 of the light pipe 300. The light pipe 300 can be rectangular, hexagonal or triangular in shape. Preferably, the shape of the light pipe 300 matches the shape of the light source or LED 100 for high coupling efficiency. In the ideal case, the output of the LED 100 is totally captured by the light pipe 300. When the cross-sectional dimensions of the light pipe 300 matches the LED 100, the output brightness at the output end 320 of the light pipe 300 will generally be same as the output brightness of the LED 100. However, in commercial application, one can expect some coupling loss between the LED 100 and the light pipe 300 and transmission loss within the light pipe 300.

In accordance with exemplary embodiments of the present invention, as shown in FIGS. 3-5, 9a, 10a, 11a, 12, 13a, 14a, and 15a, the spatial optical recycling device 200 comprises a light pipe 300 and a reflector, mirror, reflective medium or reflector system 400 coupled to the output end 320 of the light pipe 300. The input end 310 of the light pipe 300 is in optical communication with or coupled to the light source 100 and the output end 320 is coupled to the reflective medium 400. The optical communication can be accomplished by placing the light pipe 300 in proximity with the light source 100 such that the input end 310 of the light pipe 300 collects light emitted from the light source 100. In the alternative, the input end 310 of the light pipe 300 can be affixed or glued to the light source 100 using epoxy or any other such heat resistant, transparent connecting material. It is appreciated that the light pipe 300 can be hollow or solid and can have any cross-sectional dimensional shape including but not limited to rectangular, hexagonal, triangular, etc. Preferably, the shape of the light pipe 300 preferably matches the shape of the light source or LED 100 for high coupling efficiency.

The light pipe 300 can be of uniform cross-sectional dimension or can be tapered having either increasing or decreasing cross-sectional dimension from the input end 310 to the output end 320. The optical recycling device 200 comprising a light pipe 300 with an increasing cross-sectional dimension can reduce the output numerical aperture. Whereas, the optical recycling device 200 comprising a light pipe 300 with a decreasing cross-sectional dimension can enhance the recycling of light at large angles, thereby providing angular recycling of the light.

The light pipe 300 can be made of glass, quartz, plastic, fused silica, acrylic, and the like. The light pipe 300 can have bare surfaces or surfaces coated with material of low refractive index for light guiding similar to standard optical fibers or the light pipe 300 can have any or all of its surfaces coated with a reflective coating such as aluminum. Although the recycling light pipe 300 described and shown herein is a solid light pipe, in practice and commercial application, the light pipe 300 can be hollow with openings at the input and output ends 310, 320 and mirrors forming the reflecting surfaces. Openings at the input and output ends 310, 320 can be coated with anti-reflective material to increase the efficiency of the light pipe 300 in recycling the light.

Figure 3:
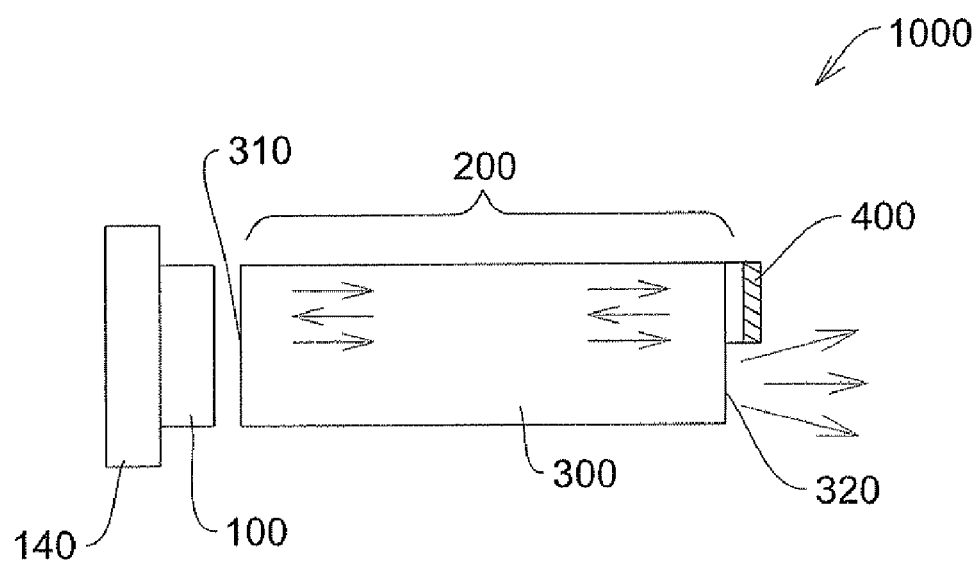
FIG. 3 is a cross-sectional view of an illumination system in accordance with an exemplary embodiment of the present invention, showing a reflector or mirror covering a portion of the output end of the light pipe.

The reflective medium 400 is mounted on the output end of the light pipe 300 and covers a portion of the output end 320 of the light pipe 300. The reflective medium 400 can be an external reflector, mirror or reflective coated material. Alternatively, the reflective medium 400 can be integrated with the light pipe 300, such as depositing the output end 320 of the light pipe 300 with reflective coating. Since the reflective medium 400 covers the portion of the output end 320 of the light pipe 300, a portion of the light from the light source 100 is reflected back into the light pipe 300. The reflected light 110 is transmitted to the light source 100 by the light pipe 300 and re-emitted or reflected back into the light pipe 300 as an output from the light source 100, as shown in FIG. 3. Since the area of the output end 320 of the light pipe 300 is reduced by the reflector 400, any light reflected back into the light pipe 300 by the reflector 400 will enhance or increase the brightness of the light being outputted from the light source 100 and exiting the light pipe 300, thereby increasing the brightness of the illumination system in accordance with an embodiment of the present invention. Although the overall output power will be smaller from the light pipe 300, the brightness of the light output will be increased by the recycling of a portion of the light from the light source 100 by the optical recycling device 200 of the present invention.

Figure 24:
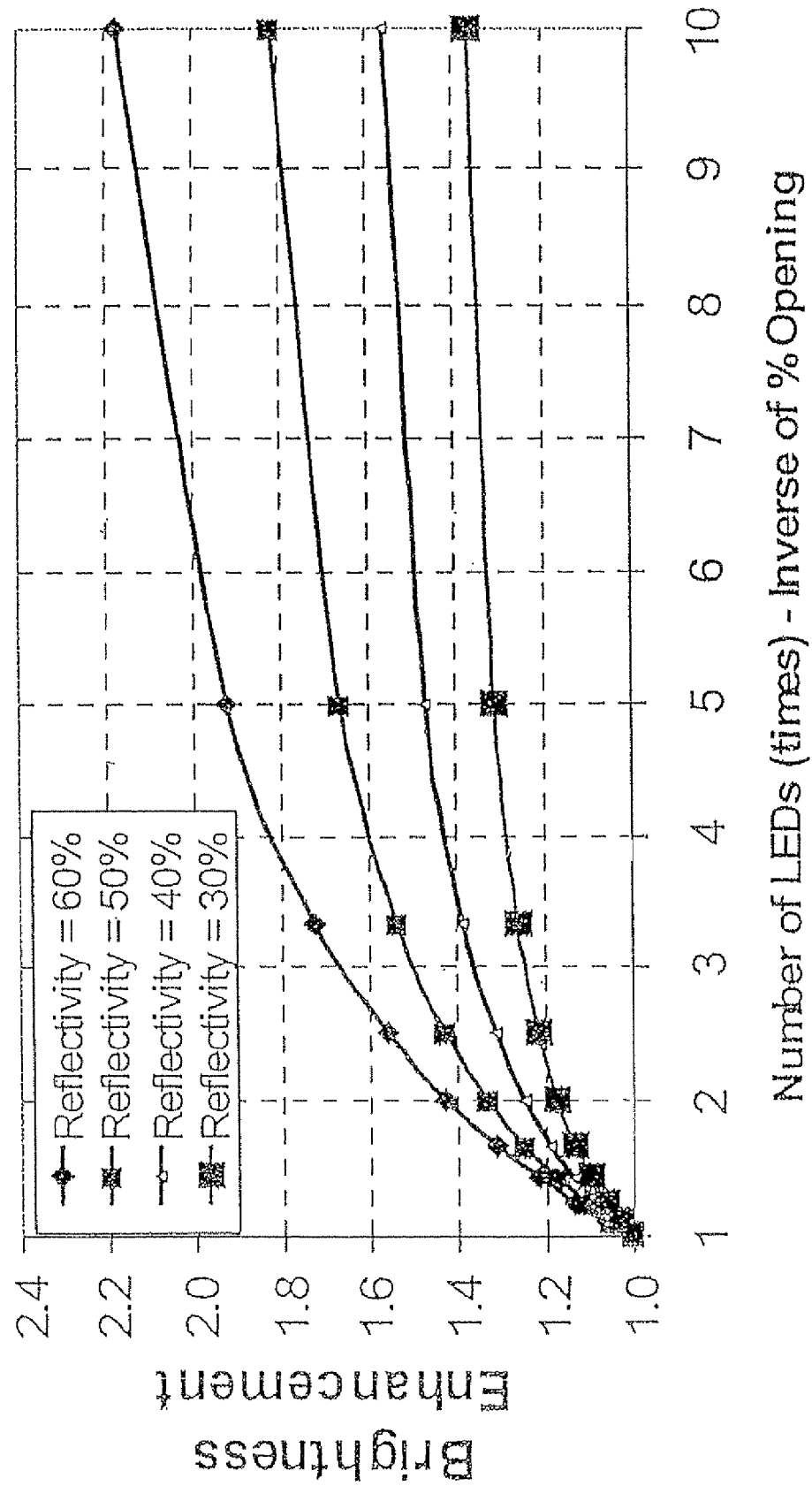
FIG. 24 illustrates calculated brightness enhancement curves for various LED reflectivity in accordance with an exemplary embodiment of the present invention.

Typically, the LED chip or die 100 has a certain reflectivity defined by the ratio of light reflectivity off the surface compared to the amount of light incidence onto the surface. The surface of the LED chip 100 is also non-specula, which is defined by the scattering factor. The theoretical recycling efficiency of the spatial recycling device 200 calculated by ray tracing for various LED reflectivity is shown in FIG. 24. The brightness enhancement of the spatial recycling device 200 of the present invention is plotted against the number of LEDs 100, which is inverse of the percentage (%) of opening at the output end 320 of the light pipe 300. For example, the output of the spatial recycling device 200 of the present invention is 1.9 times brighter for a LED reflectivity of 60% for 20% opening at the output end 320 (corresponding to five LEDs) of the light pipe 300.

Figure 25:
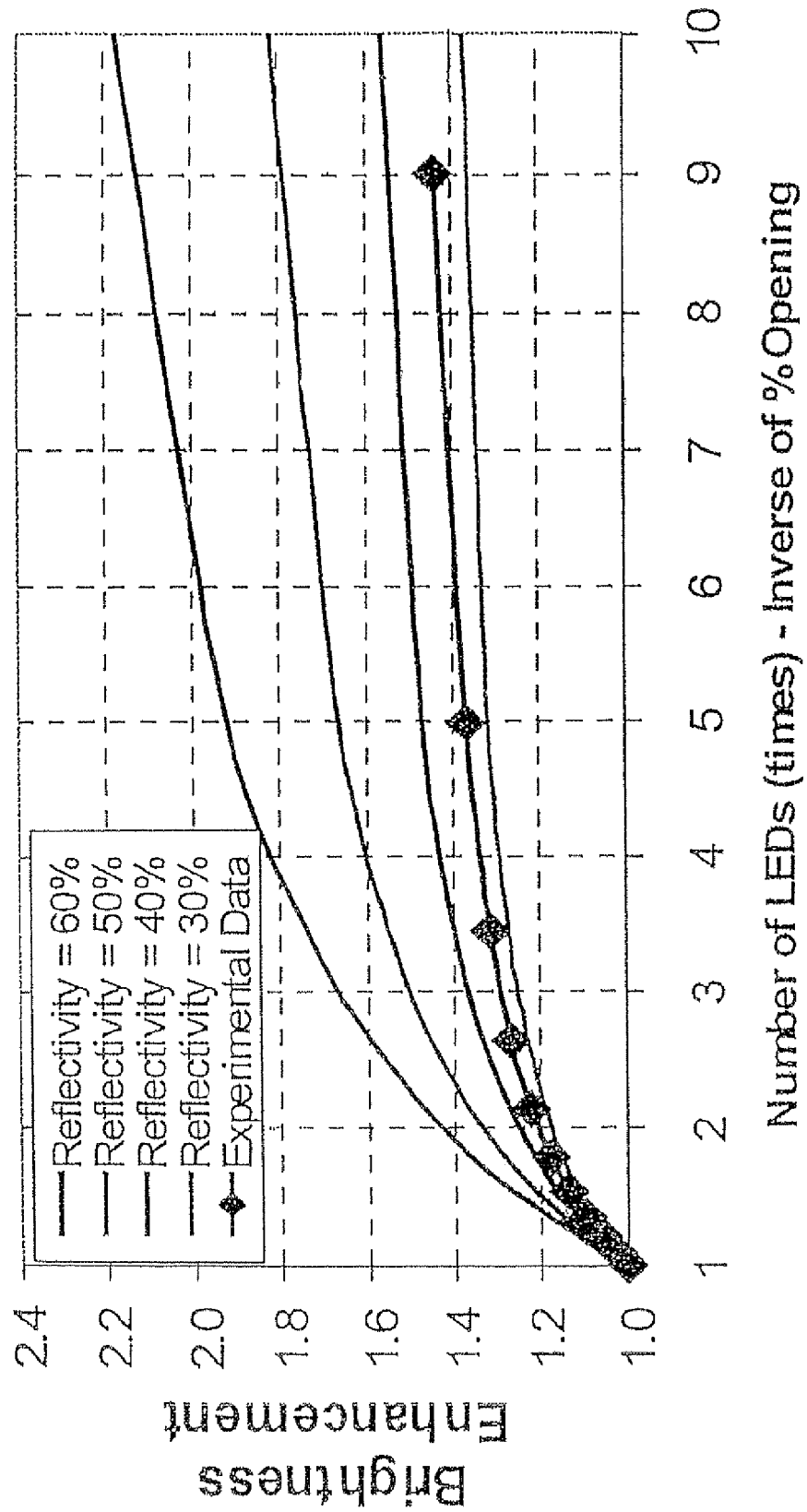
FIG. 25 illustrates experimental brightness enhancement curves for various LED reflectivity in accordance with an exemplary embodiment of the present invention.
Figure 26:
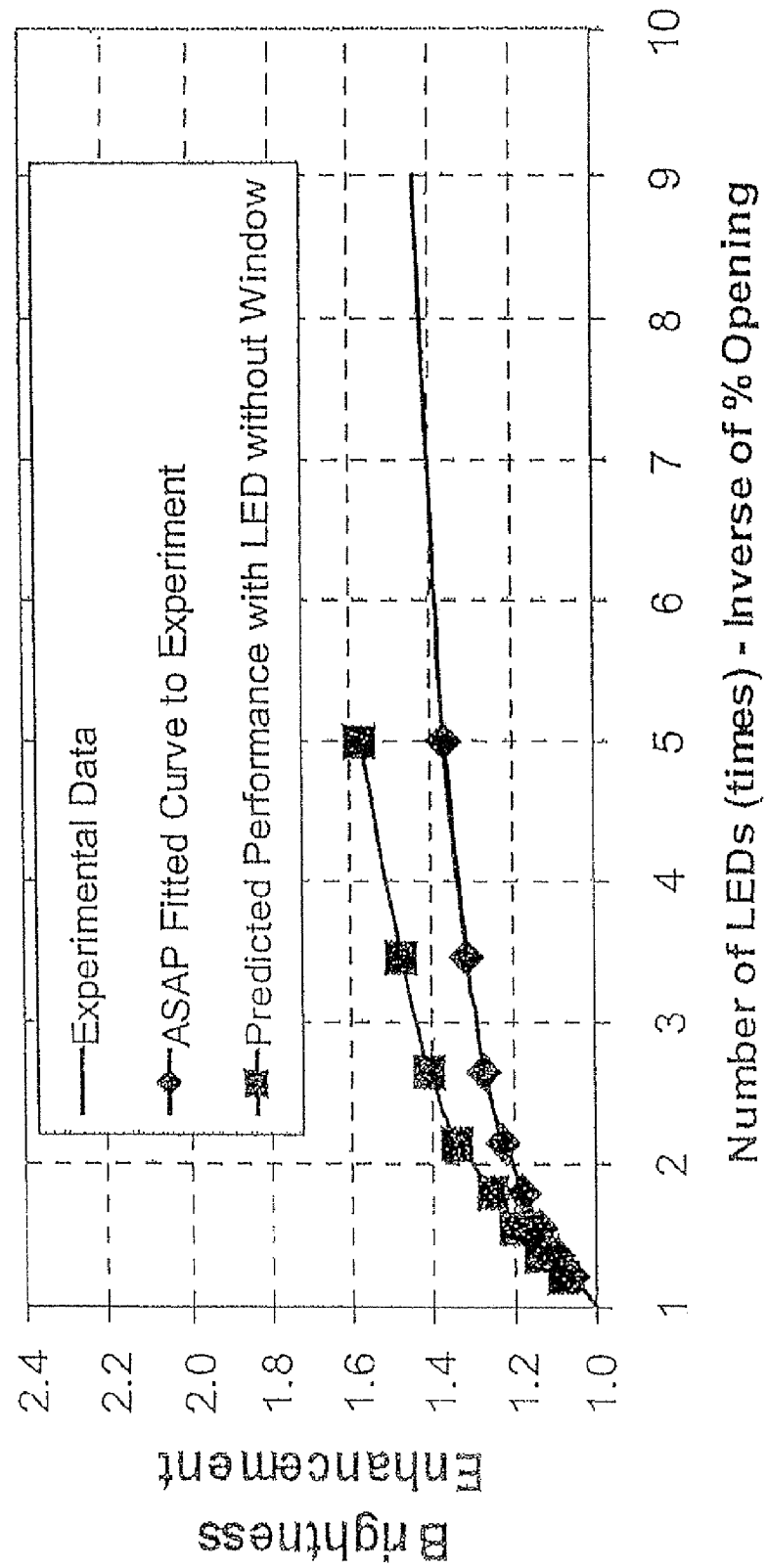
FIG. 26 illustrates calculated brightness enhancement curves with LED in close proximity to the light pipe in accordance with an exemplary embodiment of the present invention.

Experimental results plotted against the theoretical curves of FIG. 24 are shown in FIG. 25 of the spatial recycling device 200 using an LED made by an undisclosed vendor. A mirror 400 was placed at the output end 320 of the light pipe 300 such that the mirror can be adjusted to provide various percent openings. Since the LED chip 100 was mounted on the heat sink 140 with a transparent window, as a result, the coupling efficiency was not 100% between the LED 100 and the light pipe 300. Additionally, the reflectivity of the mirror 400 at the output end 320 of the light pipe 300 was not 100%. Because of the reflectivity loss of the LED 100 and other experimental imperfections contributing to the loss, the observed reflective was less than the reflectivity of the LED. The physical model of the experimental spatial recycling device 200 was obtained with an ASAP ray tracing program with R (reflectivity) and S (scattering) of the LED as curve fitting parameters. At the best fit, the reflectivity R was found to be 52% and the scattering S was found to be 18 degrees. Also, ASAP ray tracing was performed with window removed such that the light pipe 300 is in close proximity to the LED die 100. FIG. 26 shows the calculated brightness enhancement with the LED die 100 in direct contact with the light pipe 300 versus the number of LEDs 100, which is inverse of the percentage (%) of opening at the output end 320 of the light pipe 300. For example, the brightness enhancement of 1.6 times can be obtained for this LED die 100 using the spatial recycling device 200 of the present for 20% opening at the output end 320 (corresponding to five LEDs) of the light pipe 300.

Figure 4:
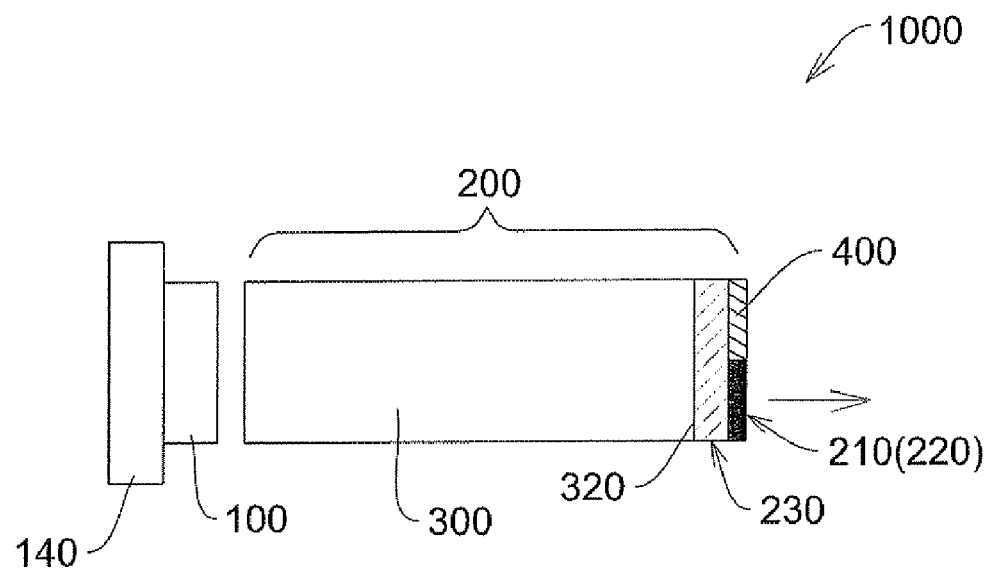
FIG. 4 shows the illumination system of FIG. 3 additionally comprising a polarizer covering a portion of the output end of the light pipe not covered by the reflector in accordance with an exemplary embodiment of the present invention.

In accordance with an exemplary embodiment of the present invention, as shown in FIG. 4, the optical recycling device 200 includes a polarizing beam splitter (PBS) 220 or polarizer 210, preferably a reflective polarizer 210, to provide a polarized illumination system 1000. The reflective polarizer 210 or PBS 220 can cover the entire output end 320 of the light pipe 300 or only portion of the output end 320 not covered by the reflector 400. Additionally, the reflective polarizer 210 or PBS 220 can be placed or mounted on the output end 320 of the light pipe 300 before or after the reflector 400. The reflective polarizer 210 or PBS 220 reflects the light with undesirable or unwanted polarization back into the light pipe 300, thereby enhancing the recycling effect of the optical recycling device 200 of the present invention and increasing the brightness of the output light.

In accordance with an exemplary embodiment of the present invention, as shown in FIG. 4, the optical recycling device 200 includes a wave plate 230 to promote scrambling of the light polarization state to increase the efficiency of the optical recycling device 200. The wave plate 230 can be placed between the output end 320 of the light pipe 300 and the reflective polarizer 210.

Figure 5:
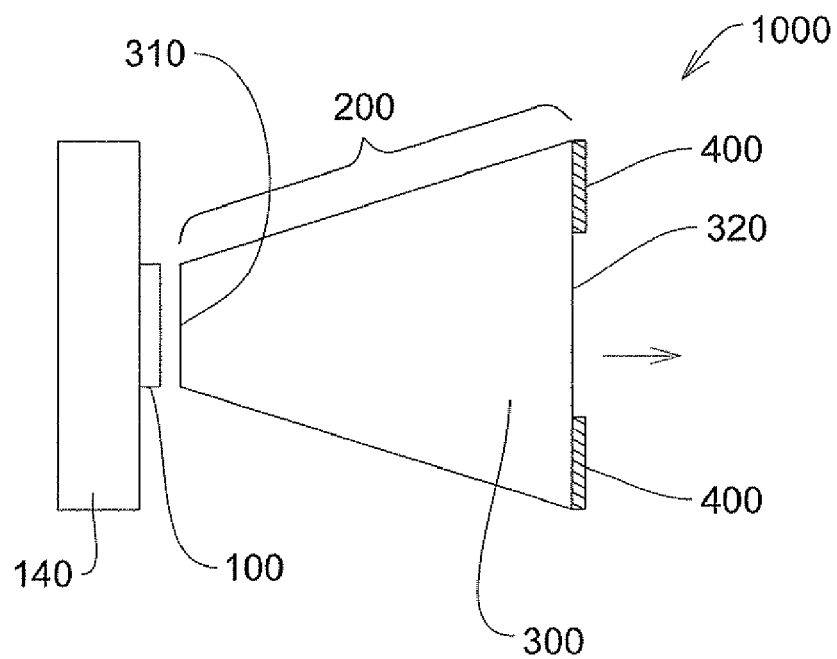
FIG. 5 is a cross-sectional side view of an illumination system in accordance with an exemplary embodiment of the present invention, showing reflectors around the perimeter of the output end of a tapered light pipe.

Referring now to FIG. 5, in accordance with an exemplary embodiment of the present invention, the spatial and angular recycling device 200 comprises an LED chip 100, a tapered light pipe 300 where the input end 310 is narrower than the output end 320, and a mirror 400 around the perimeter of the output end 320 of the tapered light pipe 300. The LED Chip 100 is mounted on the heatsink 140. The narrower input end 310 of the tapered light pipe 300 is in optical communication with LED chip 100. It is appreciated that an air gap between the LED chip 100 and the input end 310 of the tapered light pipe 300 can be filled low index epoxy. The utilization of the tapered light pipe 300 in this embodiment of the present invention increases both the efficiency and brightness within a certain cone angle. When LEDs 100 are used as the light source, the brightness is typically the most important parameter because usually only the light output within a small angle can be collected. For example, the collection angle in a commercially available rear projection television (RPTV) is estimated to be about 38 degrees and the light emitted by the LEDs 100 in such RPTV from 38 to 90 degrees will be not utilized and wasted. The recycling tapered light pipe 300 of the present invention collects light from the LED 100, selects the appropriate angle of light to be transmitted as output and recycles the rest of the light back to the LED 100, thereby recycling the non-utilized light outside the selected angle to effectively increase the brightness of the LED 100. The mirror 400 placed around the perimeter of the output end 320 of the light pipe 300 reflects the light outside the selected angle to the LED 100, thereby recycling the unused light. The amount of light outputted by the LED 100 using the spatial recycling device 200 of the present invention within the selected angle is larger than the amount of light the LED 100 emits by itself within the selected angle, thereby increasing the brightness of the LED 100 within the useable range.

Figure 14A:
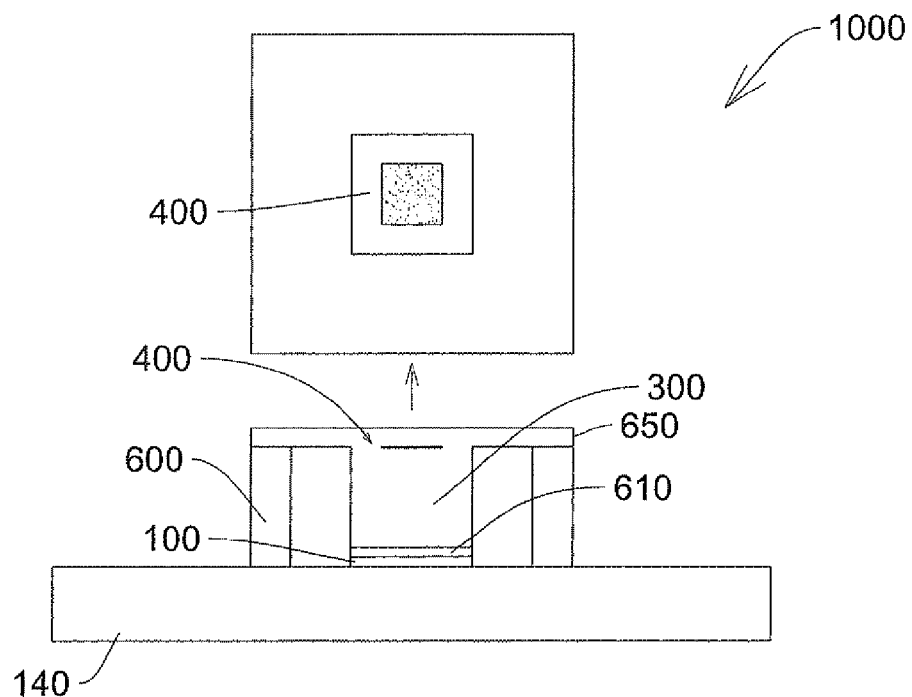
FIGS. 14a-b are cross-sectional views of an illumination system comprising a mounting frame for mounting a glass plate and a straight or tapered light pipe coupled to an LED on a substrate in accordance with an exemplary embodiment of the present invention.
Figure 14B:
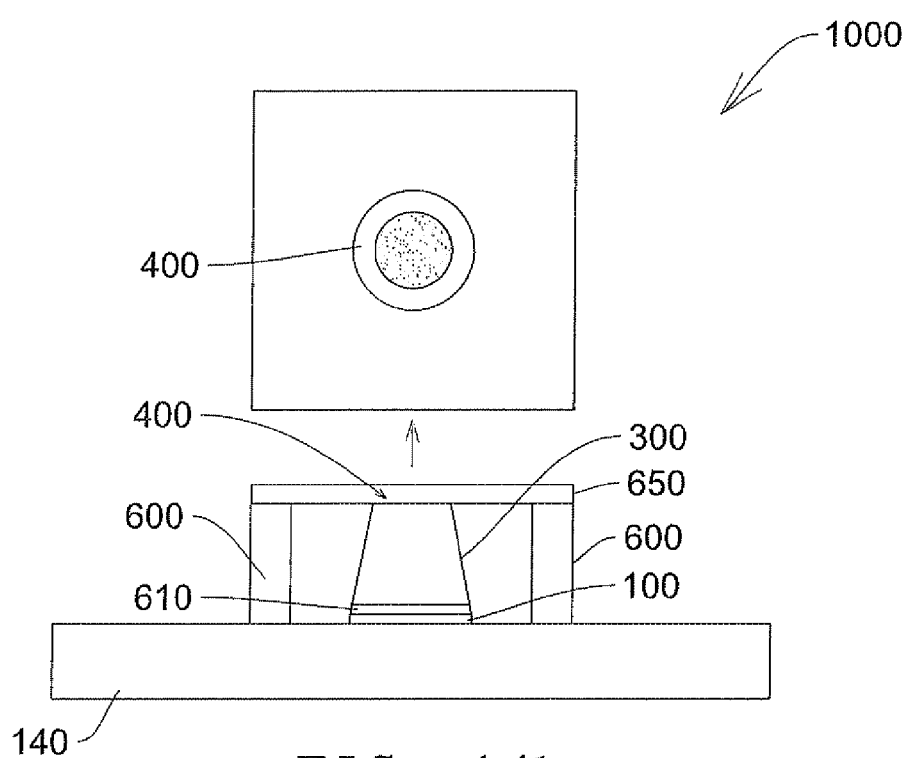

In accordance with an exemplary embodiment of the present invention, as shown in FIGS. 14a-b, the recycling or recovery light pipe 300 (straight or tapered) of the present invention can be integrated with the packaging of the LED 100. The LED 100 and a mounting frame 600 are mounted on the heatsink or substrate 140. A glass plate or cover 650 is mounted on the mounting frame 600 and can be integrated with or attached to the light pipe 300. The glass cover 650 also serves to protect the LED chip 100. The size of the mounting frame 600 can be adjusted to control the gap 610 between the light pipe 300 and the LED chip 100. Preferably, the light pipe 300 is at close proximity to the LED chip 100 for maximum coupling of light from the LED 100 into the light pipe 300 and for light reflected back to the LED 100 through the light pipe 300 by the mirror 400.

As shown in FIGS. 14a-b, at the output end 320 of light pipe 300, a portion of the surface is covered with reflective surface (e.g., reflective medium, coating or mirror 400) to promote recycling of light within the light pipe 300. Preferably, the reflective medium 400 is around the perimeter of the surface of the output end 320 of the light pipe 300. Although not shown, other configurations can be used, such as covering the part of the output surface with the reflective medium 400 biased to one side or the other. As noted herein, the light pipe 300 can be attached to the glass cover 650 to facilitate mounting of various optical components of the optical recycling device 200. The assembly process for an integrated light pipe of the present invention is similar to the standard LED assembly except that the glass cover 650 is formed together with the light pipe 300. It is appreciated that the tight pipe 300 can be tapered (decreasing or increasing), straight, solid or hollow depending on the application. A hollow tight pipe can be assembled by attaching four mirrors to the cover glass 650 by epoxy, solder, or other attachment means.

Figure 15A:
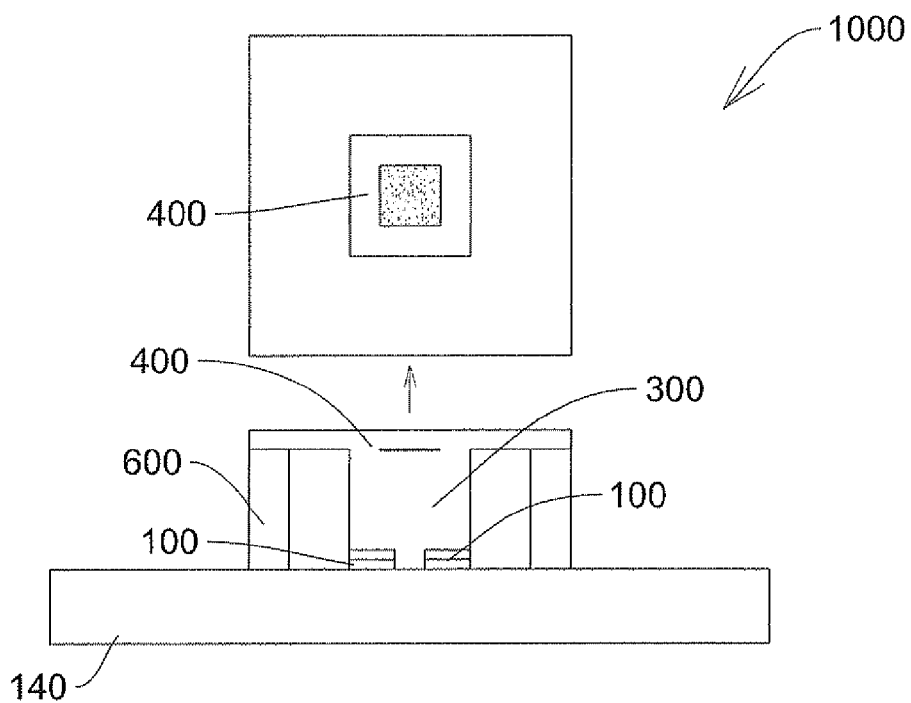
FIGS. 15a-b are the illumination systems of FIGS. 14a-b comprising two LED chips.
Figure 15B:
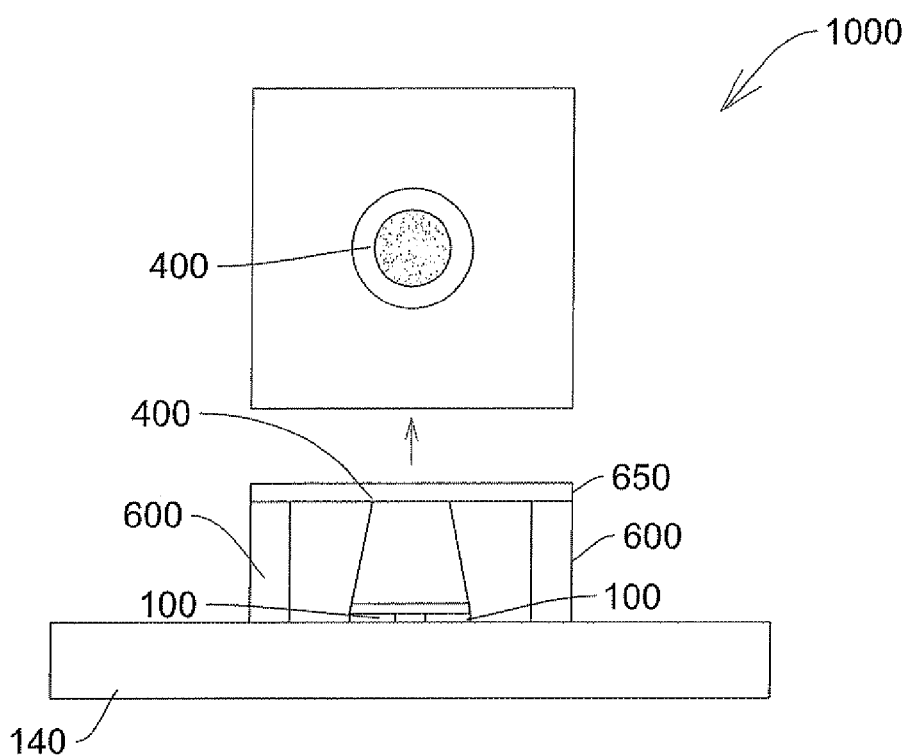

In accordance with an exemplary embodiment of the present invention, the straight or tapered light pipe 300 can be integrated with the packaging of a multiple LED chips 100, such as two LED chips 100 in FIGS. 15a-b. Multiple LEDs or LED chips 100 are mounted on the heatsink or substrate 140 with a single mounting frame 600. As shown in FIGS. 15a-b, at the input end 310 of the light pipe 300, the surface corresponding to the space between the LED chips 100 are coated with reflective coating promote recycling of the light within the light pipe 300.

It is appreciated that most LEDs have Lambertian emission pattern. Special LEDs made with photonic lattice has emission pattern that is enhanced at small angle such the brightness is higher. In either case, the brightness at small angle is higher than the brightness at higher angle. As a result, if higher brightness is desired, only small angle emission can be used, this wasting all the high angle emissions. The resulting system is very inefficient. To overcome this shortcoming, an angular recycling system is used such that the high angle emission is reflected back into the LED and only low angle emission is being transmitted. FIG. 5 shows the schematic diagram of an angular recycling system.

Figure 6:
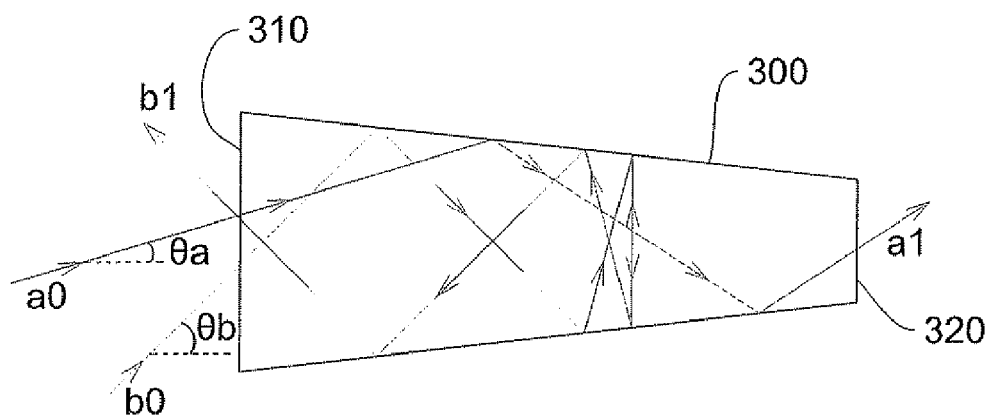
FIG. 6 is a cross-sectional side view of a decreasingly tapered light pipe angularly recycling light in accordance with an exemplary embodiment of the present invention.
Figure 7:
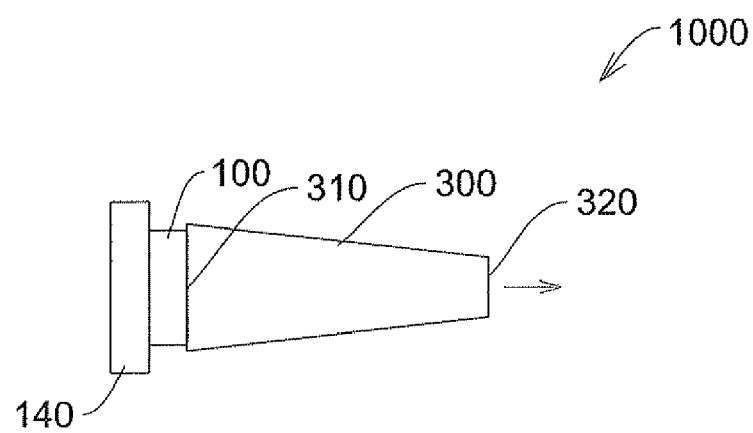
FIG. 7 is a cross-sectional side view of an illumination system comprising decreasingly tapered light pipe of FIG. 6 in accordance with an exemplary embodiment of the present invention having a tapered light pipe.

Referring to FIGS. 6-8, 9b, 10b, 11b, 13c-d, 14b and 15b, in accordance with exemplary embodiments of the present invention, the optical recycling device 200 comprises a hollow or solid tapered light pipe 300. FIG. 6 shows an angular recycling device 200 comprising a decreasingly tapered light pipe 300 tapering from a larger area to a small area (the input end 310 is larger than the output end 320). This decreasingly tapered light pipe 300 can be used to filter out input light with large incidence angles. That is, input light with large incidence angles are reflected and only input light with small incidence angles are transmitted by the decreasingly tapered light pipe 300. The input light ray a0 entering the input end 310 of the decreasingly tapered light pipe 300 at an incidence angle of θa is reflected inside the decreasingly tapered light pipe 300 multiple times and exits through the output end 320 of the decreasingly tapered light pipe 300 as output ray a1. It is appreciated that input light ray can exit the increasingly tapered light pipe 300 with a larger degree of incidence. The light ray b0 entering the input end 310 of the decreasingly tapered light pipe 300 at a large incidence angle of θb is also reflected multiple times within the decreasingly tapered light pipe 300, but before reaching the output end 320 of the decreasingly tapered light pipe 300, the angle of the light ray b0 reaches beyond 90 degrees of incidence. The light ray b0 starts to reflect back towards the input end 310 of the decreasingly tapered light pipe 300 and exits the input end 310 rather than the output end 320 of the decreasingly tapered light pipe 300 as light ray b1, as shown in FIG. 6. The decreasingly tapered light pipe 300 in effect acts as an angle filter for the incident input light, in which light with small incidence angles are transmitted and light with large incidence angles are rejected or reflected by the decreasingly tapered light pipe 300.

Figure 8:
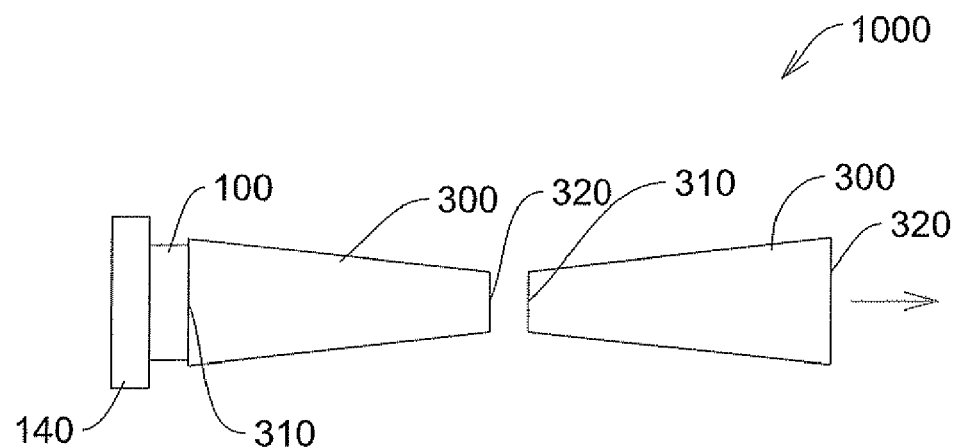
FIG. 8 is a cross-sectional side view of an illumination system comprising two tapered light pipes coupled to each other in accordance with an exemplary embodiment of the present invention.

In accordance with exemplary embodiments of the present invention, as shown in FIGS. 7-8, 9b, 10b, 11b, 13 c-d, 14b and 15b, the angular recycling device 200 comprises decreasingly tapered light pipe 300 and a plurality of LEDs 100, An LED 100 is placed in front of the input end 310 of the decreasingly tapered light pipe 300 with the area of the LED 100 being substantially the same as the area of the input end 310 of the decreasingly tapered light pipe 300. The light with a high angle of incidence or high angle light is reflected back into the LED 100 by the decreasingly tapered light pipe 300 of the present invention. The reflected light is recycled in the LED 100 and reflected back into the decreasingly tapered light pipe 300 with a different angular distribution than the original input light. That is, a portion of the recycled reflected light now has a small angle of incidence (or small angle light)

to be transmitted by the decreasingly tapered light pipe 300 and coupled to the output of the decreasingly tapered light pipe 300. The small angle light exits the output end 320 of the decreasingly tapered light pipe 300 as an output. Since the LED surface has scattering, part of the reflected light at higher angle is scattered to lower angled and coupled out of the angular recycling device 200, thereby increasing the brightness of the illumination system 1000. In accordance with an exemplary embodiment of the present invention, as shown in FIG. 8, the output end 320 of the decreasingly tapered light pipe 300 can be coupled to the input end 310 of another tapered light pipe 300 (preferably, increasingly tapered light pipe), thereby reducing the high angle light from the LED but increasing the light output area.

In accordance with exemplary embodiments of the present invention, the illumination system 1000 comprises a plurality of LEDs 100 coupled to a single output light pipe 300. Turning now to FIGS. 11a-b and 12, two LEDs 100 are coupled to a single output light pipe 300 (straight light pipe as in FIG. 11a or tapered light pipe as in FIG. 11b) using two tapered input light pipes 350, preferable increasingly tapered light pipes 350, in accordance with an exemplary embodiment of the present invention. The input ends of the tapered input light pipes 350 are respectively coupled to two LEDs 100 and the output ends of the tapered input light pipes 350 are coupled to the output light pipe 300. As noted herein, the output end 320 of the output light pipe 300 is partially coated with reflective coating or medium to promote recycling within the optical recycling device 200, thereby increasing the brightness of the illumination system 1000. The dimensions of the output ends of the tapered input light pipes 350 are preferably matched to the dimensions of the input end of the output light pipe 300, such that there are minimal gaps between the output ends of input light pipes 350 to achieve high coupling of light.

In accordance with exemplary embodiments of the present invention, as shown in FIGS. 9a-b, 10a-b, 11a-b and 12, the illumination system 1000 comprises a plurality of LED chips or LEDs 100, preferably closely packed, in a single dimension (i.e., a row of LEDs) or in a two-dimensional array. Preferably, as shown in FIGS. 11a-b and 12, the LEDs/LED chips 100 and the input light pipes 350 are densely or closely packed. The shapes of the LEDs 100 and the input light pipes 350 can be circular, triangular, hexagonal, octagonal and the like. Although the dimensions of the LEDs 100 and input light pipes 350 can be uniform, but it can vary depending on the application of the illumination system. That is, the optical recycling device 200 can comprises a plurality of LEDs 100 having varying shapes and sizes and a plurality of input light pipes 350 having varying shapes and sizes. In accordance with an exemplary embodiment, the LED 100 and the input light pipe 350 that the LED 100 is coupled to (i.e., LED-light pipe pair) have the substantially similar shape. For example, a triangular shaped input light pipe 350 is coupled to a triangular shaped LED 100. This advantageously permits the illumination system 1000 of the present invention to be designed to provide a particular output power by combining existing and readily available LEDs 100 of varying output power and size. Moreover, the utilization of multiple LEDs 100 additionally provides averaging effects for output power and wavelength. Typically in LED production, the output power and wavelength of the LEDs/LED chips are not well controlled. Current LED production requires the "binning" of LED chips with several wavelengths and several power ranges. When several LEDs are combined into a single source of output in accordance with various embodiments of the present invention, the average variation of the illumination system 1000 (or a light source) as a whole is smaller in both output power and wavelength. It is appreciated that when sufficient LEDs are used as a single source of light output as in various embodiments of the present invention, the binning may not be required, thereby improving the yield of LEDs/LED chips and saving manufacturing cost.

Typically two or more colors are used in a color projection system. In accordance with an exemplary embodiment of the present invention, the illumination system 1000 comprises various colored LEDs or LED chips 100, which can be combined and mixed, for example, using techniques disclosed in co-pending application Ser. No. 11/351,013 entitled Etendue Efficient Combination of Multiple Light Sources, owned by the common assignee of this application, which is incorporated herein by reference in its entirety. That is, for example, the present invention can be utilized to provide 3-color (red, green and blue) projection systems, or 4-color and 5-color projections systems, which are starting to gain some momentum.

Figure 9A:
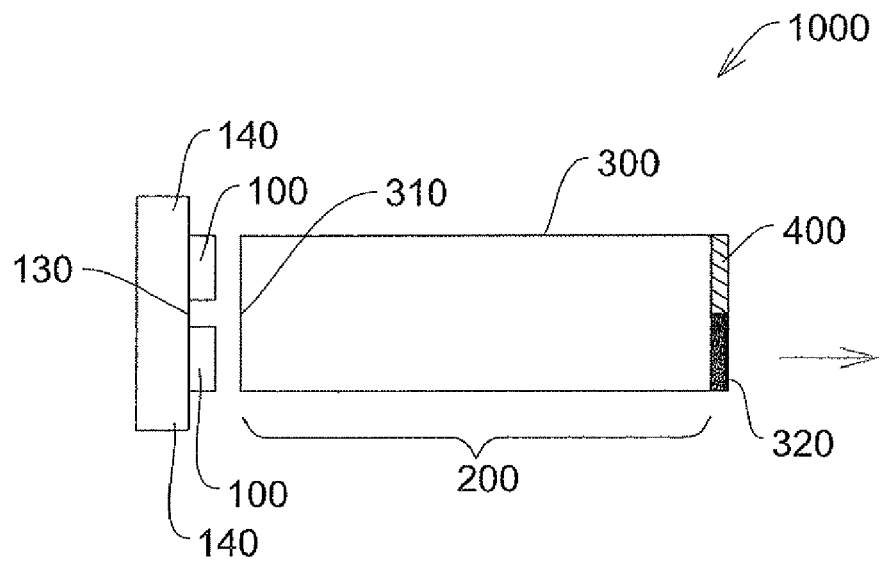
FIGS. 9a-b are cross-sectional side views of an illumination system comprising two LEDs mounted on a substrate with a reflective coating disposed on the substrate between the LED's and respectively coupled to a straight or tapered light pipe in accordance with an exemplary embodiment of the present invention.
Figure 9B:
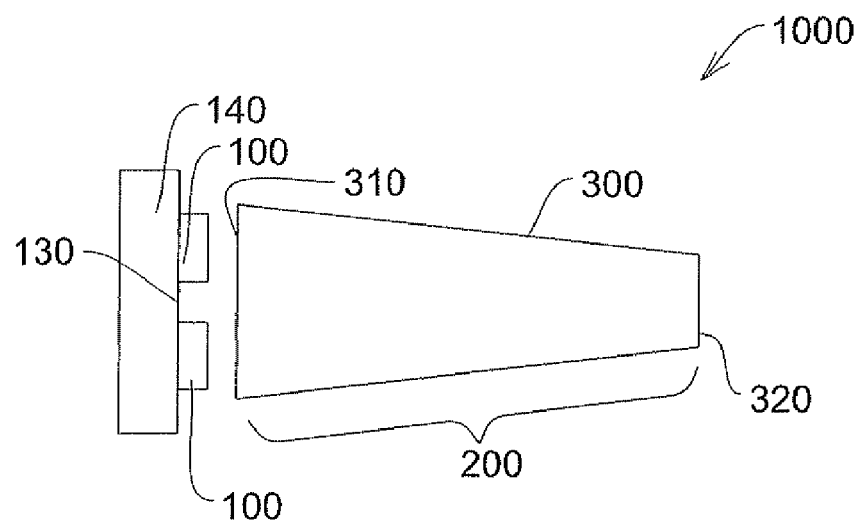
Figure 10A:
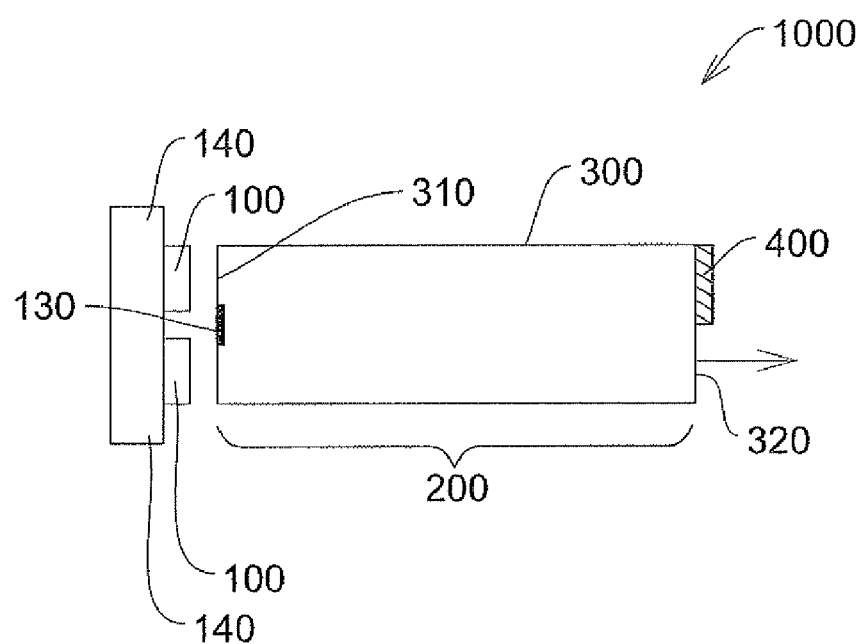
FIGS. 10a-b are cross-sectional side views of an illumination system comprising two LEDs mounted on a substrate and respectively coupled to a straight or tapered light pipe with a reflective coating disposed on the input end of the light pipe between the LED's in accordance with an exemplary embodiment of the present invention.
Figure 10B:
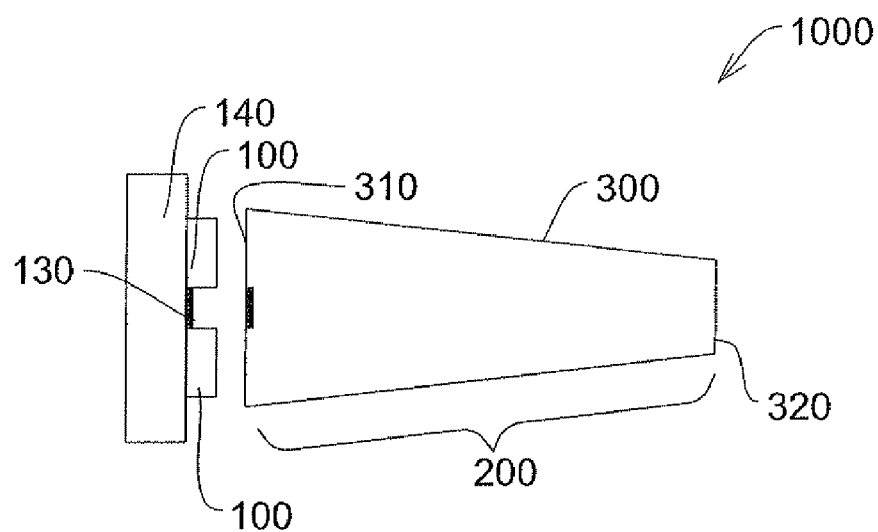

In accordance with exemplary embodiments of the present invention, as shown in FIGS. 9a-b and 10a-b, the optical recycling device 200 comprises multiple LED chips 100 coupled to the input end 310 of the light pipe 300. As noted herein, the LED chips 100 are densely packed by minimizing the spacing between the LED chips 100. Although the spaces between the LED chips 100 can be made reflective, partially reflective or non-reflective, the spaces are preferably reflective to promote recycling of the light, thereby increasing the efficiency of the optical recycling device 200. In accordance with an exemplary embodiment of the present invention, as shown in FIGS. 9a-b, the surface of the substrate 140 between the LED chips 100 (i.e., spaces 130) are made reflective using reflectors, mirrors, reflective coating and the like. Alternatively, as shown in FIGS. 10a-b, the input end 310 of the light pipe 300 corresponding to the spaces 130 between the LED chips 100 can be made reflective using reflectors, mirrors, reflective coating and the like. Although only increasingly tapered light pipe 300 is shown in FIGS. 9b and 10b, either increasingly (a small input end to a large output end) or decreasingly (a large input end to a small output end) tapered light pipe 300 can be used. The increasingly tapered light pipe 300 can be used to reduce the output numerical aperture and the decreasingly tapered light pipe 300 can be used to enhance recycling light at large incidence angles.

Figure 13A:
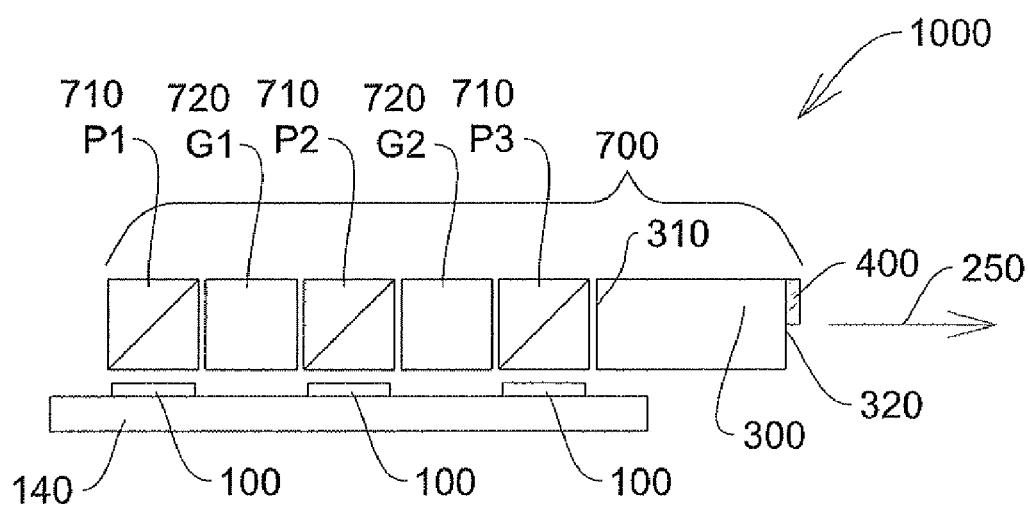
FIGS. 13a-d are cross-sectional side views of an illumination system comprising color beam combiners, coupled to straight or tapered light pipe, for combining the output of three LED chips in accordance with an exemplary embodiment of the present invention.
Figure 13B:
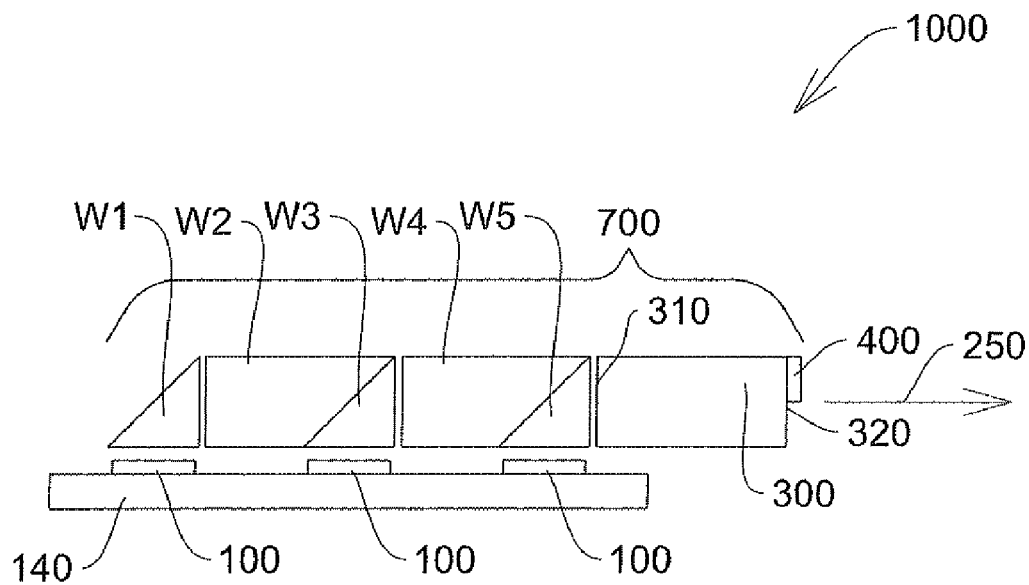
Figure 13C:
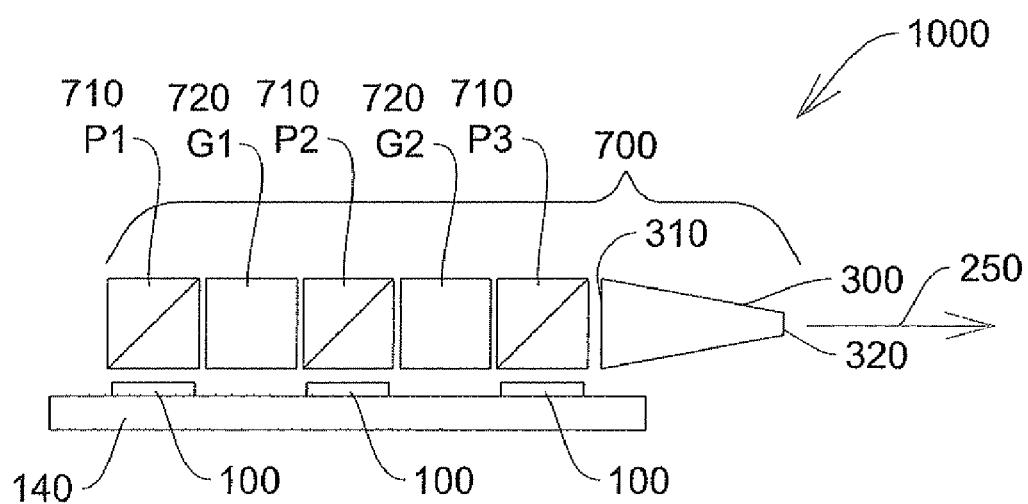
Figure 13D:
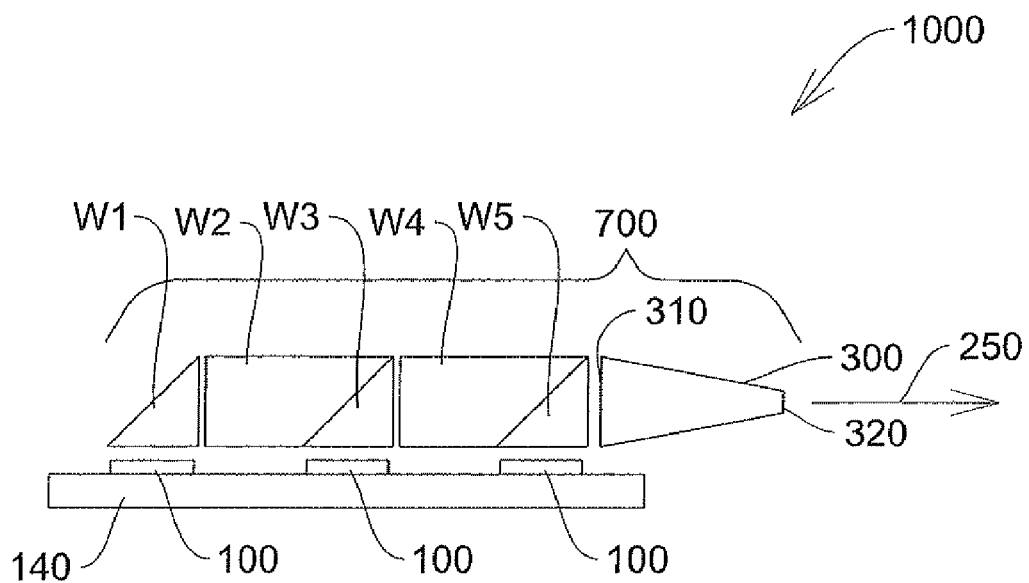

In accordance with an exemplary embodiment of the present invention, as shown in FIGS. 13a and 13b, the illumination system 1000 comprises a light pipe 300 (which can be either a straight or tapered light pipe) and a color beam combiner 700 for combining output from various colored LEDs 100 (e.g., each LED 100 emitting light having different wavelengths) into a single output 250. As shown in FIG. 13a, the color beam combiner 700 comprises cube prisms P1, P2, P3 (preferably, polarization beam splitters) and cubes G1, G2 for combining output from various colored LEDs 100, such as red, blue and green LEDs 100. The cube prism P3 is coupled to the input end 310 of the light pipe 300. The red LED (R-LED) 100 emits red light which is reflected by the cube prism P1 and into the cube G1. The cube prism P2 transmits the red light received from the cube G1 and reflects the green light emitted by the green LED (G-LED) 100. The cube prism P2 transmits both the reflected green light and transmitted red light into cube G2. The cube prism P3 transmits both the green and red light received from the cube G2, and reflects the blue light emitted by the blue LED (B-LED) 100 into the light pipe 300. Preferably, all sides of the cube prisms 710, cubes 720, and the light pipe 300 are polished to efficiently guide through the various optical components of the illumination system 1000. As noted herein, the output end 320 of the light pipe 300 has a reflective coating, reflector or mirror 400 covering a portion of the output end 320 to promote recycling, thereby increasing the brightness of the illumination system 1000.

Alternatively, the color beam combiner 700, such as triangular prisms 730, and light pipe 300 are integrated into a single piece. As shown in FIG. 13b, the illumination system 1000 comprises R-LED 100, G-LED 100, B-LED 100, waveguide sections W1-W5 and an output section 300 (which can be either tapered or straight). Preferably, the waveguide sections W1, W3 and W5 are triangular prisms. The red LED (R-LED) 100 emits red light which is reflected by the waveguide section WI and into the waveguide section W2. The waveguide section W3 transmits the red light received from the waveguide section W2 and reflects the green light emitted by the green LED (G-LED) 100. The waveguide section W3 transmits both the reflected green light and transmitted red light into waveguide section W4. The waveguide section W5 transmits both the green and red light received from the waveguide section W4, and reflects the blue light emitted by the blue LED (B-LED) 100 into the output section 300. An example of color beam combiner is disclosed in co-pending application Ser. No. 11/351,013, which is incorporated herein by reference in its entirety. Preferably, all sides of the waveguide sections W1-W5 and the output section 300 are polished to efficiently guide through the various optical components of the illumination system 1000. As noted herein, the output end 320 of the output section 300 has a reflective coating, reflector or mirror 400 covering a portion of the output end 320 to promote recycling, thereby increasing the brightness of the illumination system 1000.

Figure 16:
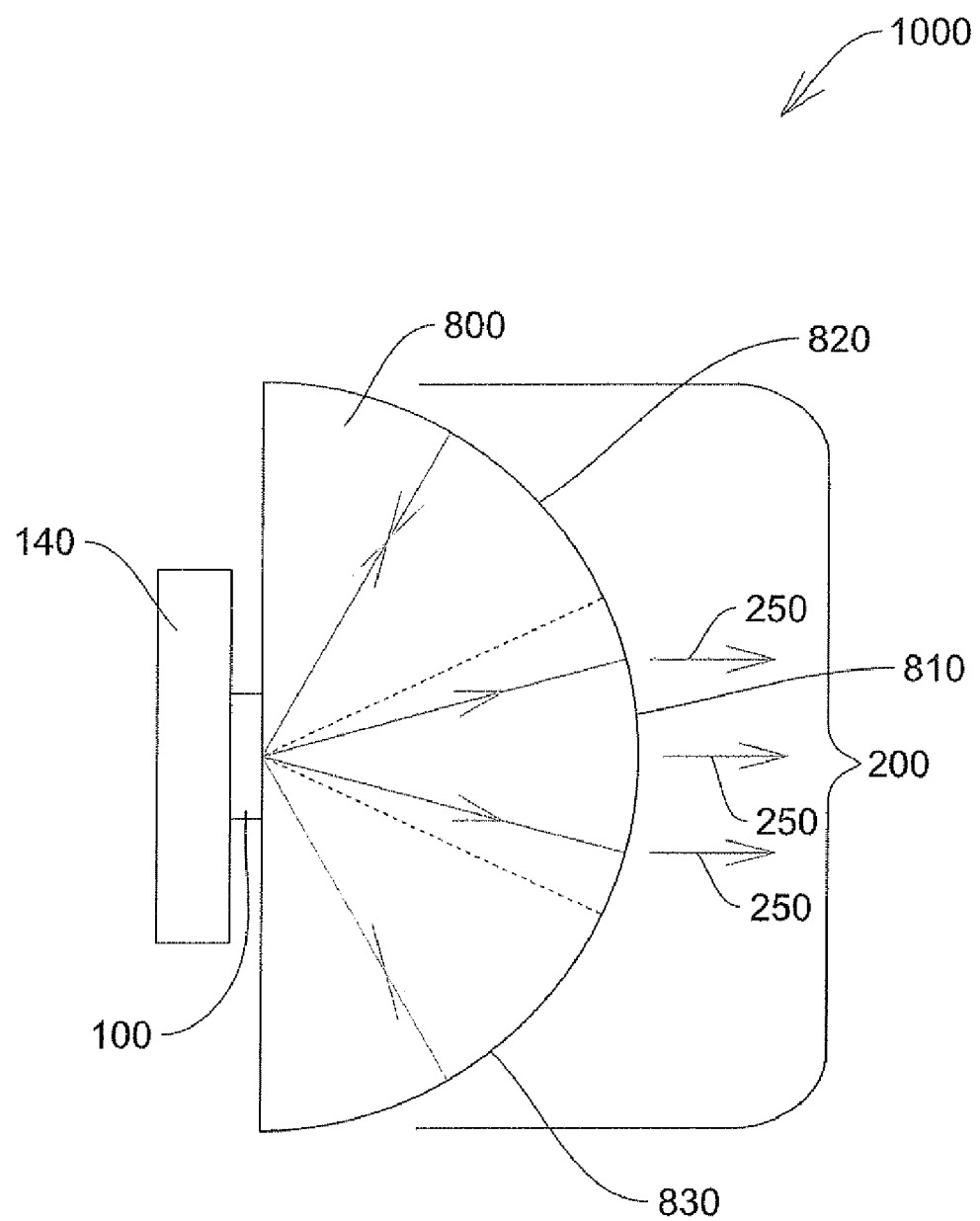
FIG. 16 is a cross-sectional side view of an illumination system comprising a solid optical component having a lens surface for coupling small angle rays of light and two concave reflective surfaces for retro-reflecting large angle rays of light to angularly recycle light in accordance with an exemplary embodiment of the present invention.

In accordance with an exemplary embodiment of the present invention, the illumination system 1000 comprises an angular recycling device 200. As shown in FIG. 16, the angular recycling device 200 comprises a LED 100 mounted on a heatsink 140 and a solid optical component made of plastic or glass 800 having reflective concave surfaces 820, 830 and lens surface 810. Preferably, the reflective concave surfaces 820, 830 surrounds the lens surface 810. The shape of the reflective concave surfaces 820, 830 can be spherical, parabolic or elliptical and can be made reflective by reflective coating. The reflective surfaces 820, 830 act as retro-reflectors to reflect high angle rays back into the LED 100 for recycling. The small angle rays (core angle shown in FIG. 16 as the angle between dotted lines 1061) of light from the LED 100 are coupled by the lens surface 810 and outputted from the angular recycling device 200 as output 250.

Figure 17:
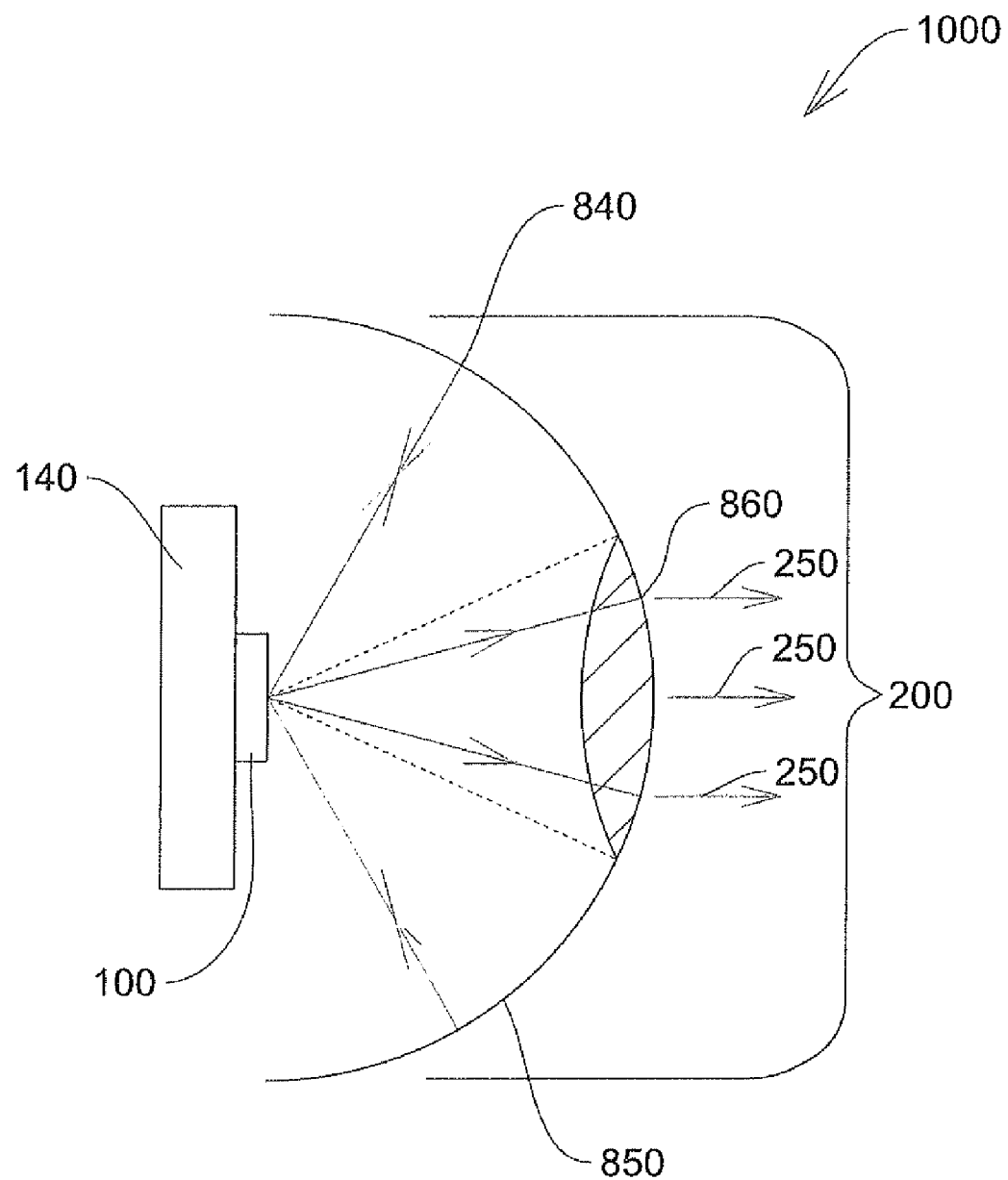
FIG. 17 is a cross-sectional side view of an illumination system comprising a lens for coupling small angle rays of light and concave reflectors for retro-reflecting large angle rays of light to angularly recycle light in accordance with an exemplary embodiment of the present invention.

Alternatively, as shown in FIG. 17, the angular recycling device 200 comprises a LED 100 mounted on a heat sink 140, reflectors 840, 850 and lens 860. The high angle rays from the LED 100 are reflected by the reflectors 840, 850 back into the LED for recycling and the small angle rays from the LED 100 are coupled by the lens 860 and outputted from the angular recycling device 200 as output 250.

Figure 18:
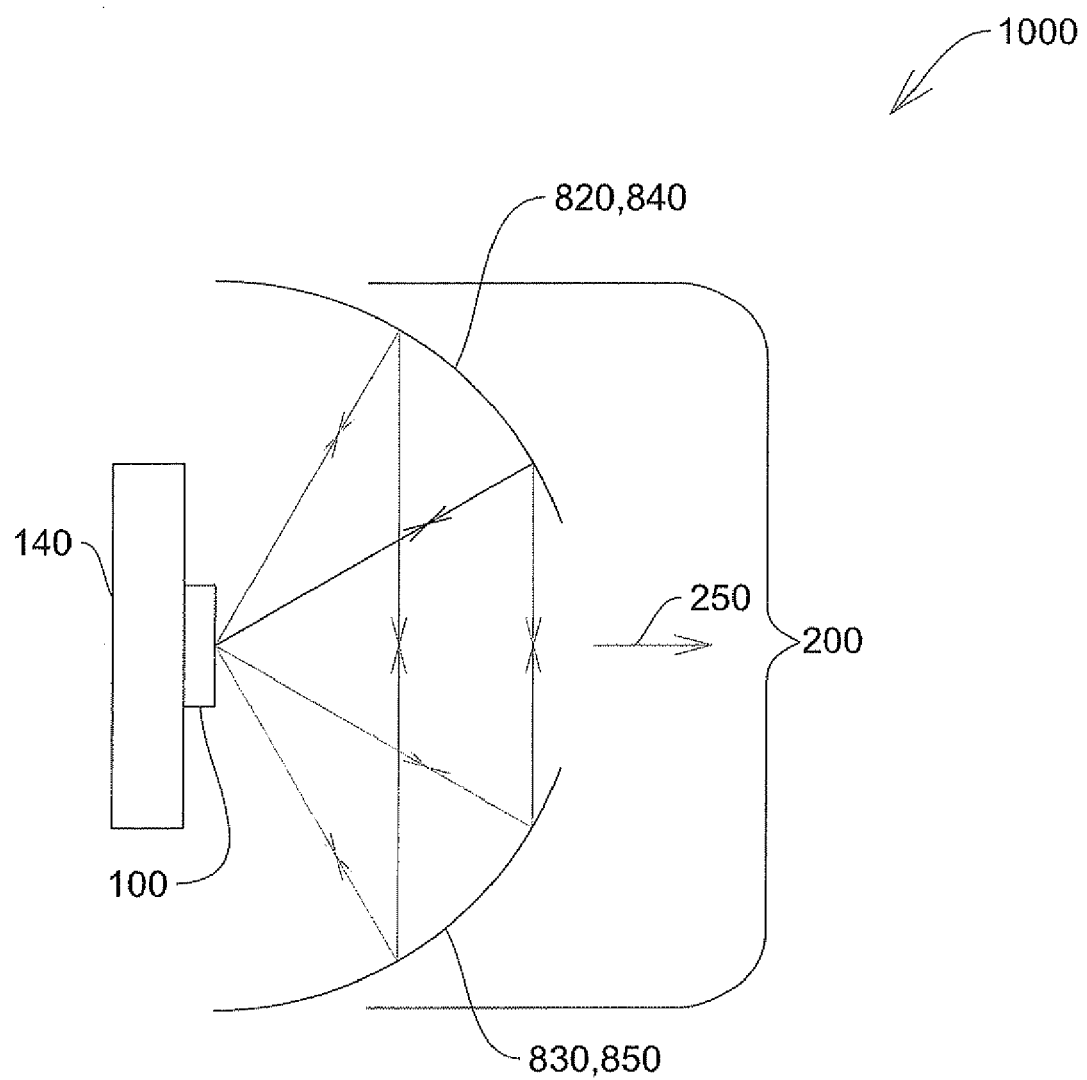
FIG. 18 is a cross-sectional side view of an illumination system of FIG. 16 or 17 for angularly recycling light using dual paraboloid reflectors or reflective surfaces in accordance with an exemplary embodiment of the present invention.

In accordance with an exemplary embodiment of the present invention, as shown in FIG. 18, the angular device 200 of FIGS. 16, 17 comprises dual paraboloid reflectors 840, 850 or the reflective surfaces 820, 830 act as dual paraboloid reflectors to reflect the high angle rays twice before being focused back onto the LED 100. That is, the light reflected from the reflective surface 820 or reflector 840 is collimated and received by the reflective surface 830 or reflector 850, respectively. The collimated light is then refocused by the reflective surface 830 or reflector 850 and focused onto the LED 100 for recycling. Additionally, it is appreciated that the radius of curvature of reflective surfaces 820, 830 and reflectors 840, 850 can be smaller than the radius of curvature of the lens surface 810 or lens 860 so that the reflective surfaces 820, 830 or reflectors 840, 850 can be closer to the LED than the lens surface 810 or lens 860.

Figure 19:
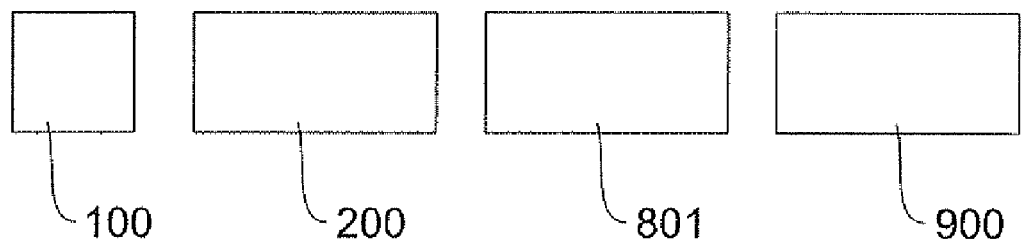
FIG. 19 is a cross-sectional side view of a LED illumination system incorporating the optical recycling device in accordance with an exemplary embodiment of the present invention.

In accordance with exemplary embodiment of the present invention, the optical recycling device 200 of the present invention can be incorporated into a traditional LED illumination system to increase the brightness of the LED source using spatial and/or angular recycling of light. Typically in a traditional LED illumination system, the light from the LED chips 100 is coupled to the application 900 (e.g., projection display screen) through an external optical system 801. As shown in FIG. 19, the spatial and/or angular optical recycling device 200 of the present invention is inserted between the LED chips 100 and the external optical system 801 to increase the brightness of the light at the application 900.

Figure 20:
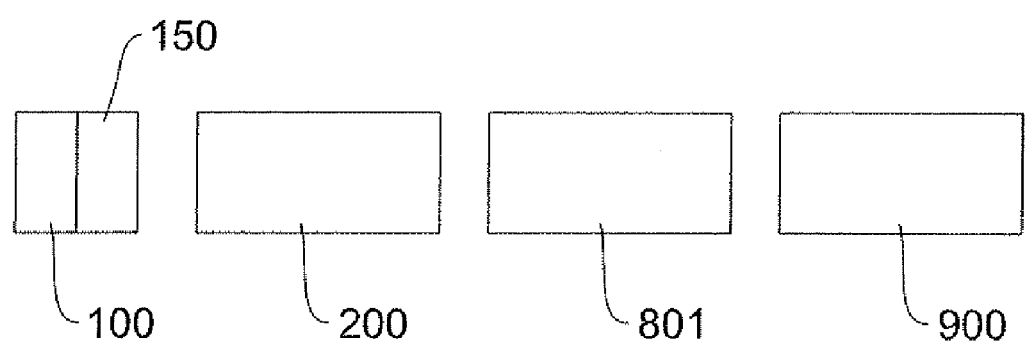
FIG. 20 is a cross-sectional side view of a LED illumination system having LED chip with integrated optics incorporating the optical recycling device in accordance with an exemplary embodiment of the present invention

Turning now to FIG. 20, the spatial and/or angular recycling device 200 of the present invention can be incorporated into a traditional LED illumination system having LED chip 100 with integrated optics 150, such as a molded lens on the LED package, for extracting light from the LED chip 100. Here, the spatial and/or angular recycling device 200 of the present invention is inserted between the integrated optics 150 and the external optical system 801 to increase the brightness of the light at the application 900.

Figure 21:
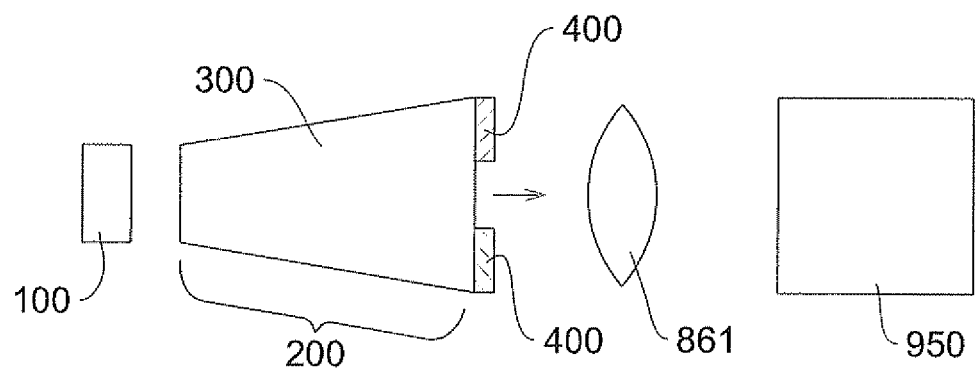
FIG. 21 is a cross-sectional side view of a LED projection system incorporating the optical recycling device in accordance with an exemplary embodiment of the present invention.

In accordance with exemplary embodiment of the present invention, the optical recycling device 200 of the present invention can be incorporated into a traditional LED projection system to increase the brightness of the LED source and/or amount of light coupled into the projection system 950 using spatial and/or angular recycling of light. Typically in a traditional LED projection system, the light from the LED chips 100 is coupled to the projection system 950 using a lens or lens system 810. As shown in FIG. 21, the spatial and/or angular optical recycling device 200 of the present invention is inserted between the LED chips 100 and the lens 810 to increase the brightness of the light and/or amount of light coupled into the projection system 950.

Figure 22:
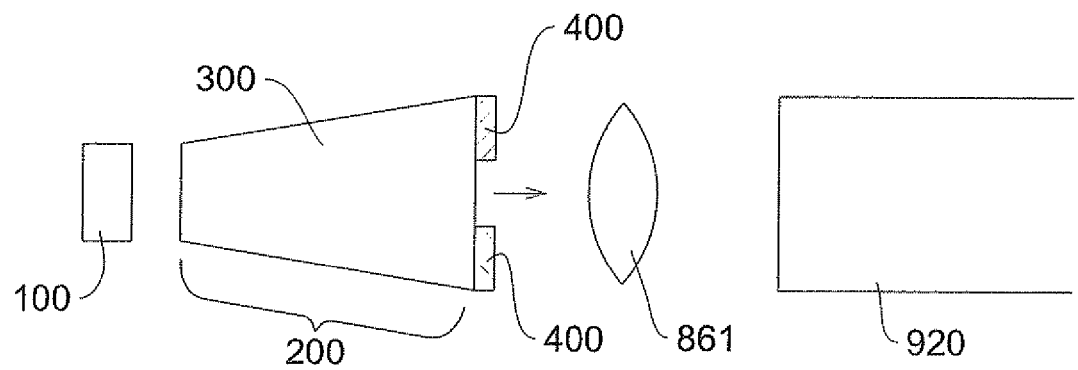
FIG. 22 is a cross-sectional side view of a fiber optics system incorporating the optical recycling device in accordance with an exemplary embodiment of the present invention.

In accordance with an embodiment of the present invention, as shown in FIG. 22, the spatial and/or angular recycling device 200 of the present invention can be incorporated into a fiber optics system to increase the brightness of the LED source and total light coupled to a fiber optics 920. Here, the spatial and/or angular recycling device 200 of the present invention is inserted between the LED chips 100 and the lens 810 to increase the brightness of the light and/or amount of light coupled into the fiber optics 920.

Figure 23:
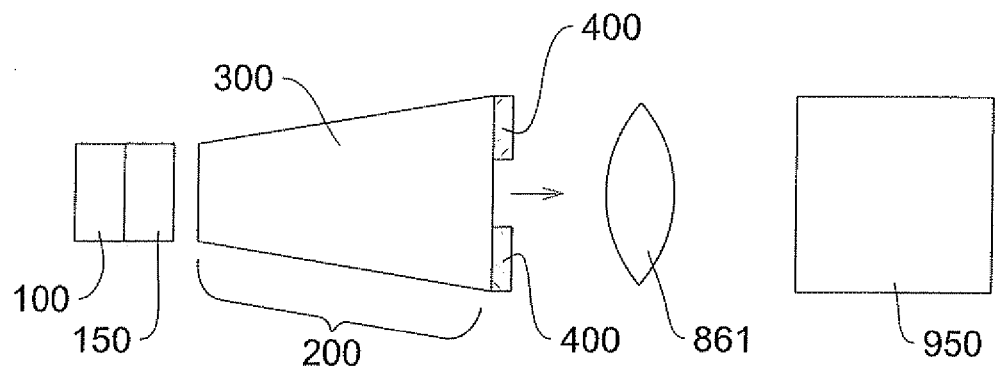
FIG. 23 is a cross-sectional side view of a LED projection system of FIG. 21 or fiber optics system of FIG. 22 having LED chip with integrated optics.

Turning now to FIG. 23, the spatial and/or angular recycling device 200 of the present invention can be incorporated into the LED projection system of FIG. 21 or the fiber optics system of FIG. 22 in which the LED chip 100 comprises an integrated optics 850 for extracting light from the LED chip 100. Here, the spatial and/or angular recycling device 200 of the present invention is inserted between the integrated optics 850 and the lens 810 to increase the brightness of the light and/or amount of light coupled into the projection system 950 or the fiber optics 920.

The invention, having been described, it will be apparent to those skilled in the art that the same may be varied in many ways without departing from the spirit and scope of the invention, Any and all such modifications are intended to be included within the scope of the following claims.

What is claimed is:

1. An illumination system for increasing the brightness of a light source, comprising:
  a light source for emitting a plurality of rays of light in a direction generally centered about an axis, wherein a first plurality of said rays are emitted within a low angle range relative to said axis, and wherein a second plurality of said rays are emitted within a higher angle range up to 90 degrees relative to said axis; and an optical recycling device coupled to said light source for receiving substantially all of said plurality of rays of light from said light source;

wherein said recycling device has an annular opening, centered on said axis, for transmitting only said first plurality of said rays, and an annular, concave reflective portion having a reflective surface surrounding said axis, said concave portion extending axially from said opening towards said light source a sufficient distance to capture substantially all of said second plurality of rays and redirect said second plurality of rays of light directly back to said light source which re-emits said portion of said plurality of rays of light to said optical recycling device, thereby increasing the brightness of said light source's output.

2. The illumination system of claim 1, wherein said optical recycling device comprises a solid optical component having a lens surface disposed in said annular opening said first plurality of rays of light.

3. The illumination system of claim 2, wherein said solid optical component has at least a generally hemispherical shape such that said reflective surface has a spherical or elliptical shape, and wherein a flat surface of said solid optical component is disposed to receive light emitted by said light source.

4. The illumination system of claim 3, wherein the light source is an LED having a generally flat, light-emitting surface, and said flat surface is disposed against said light-emitting surface such that said recycling device captures substantially all light emitted by said LED.

5. The illumination system of claim 1, further comprising a lens disposed in said annular opening such that emitted light passes through, and is focused by, said lens.

6. A method for increasing the brightness of a light source, comprising the steps of:

providing a light source which emits light in a direction generally centered about a first axis, wherein a first plurality of said rays are emitted within a low angle range relative to said axis, and wherein a second plurality of said rays are emitted within a higher angle range up to 90 degrees relative to said axis;

providing a recycling device, which has an annular opening and an annular, concave reflective portion, having a reflective surface. centered about a recycling axis;

coupling said recycling device to said light source such that said first axis and recycling axis are coplanar, such that said first plurality of said rays extends through said annular opening and such that said annular, concave reflective portion surrounds said first axis, said concave portion extending axially from said opening towards said light source a sufficient distance to capture substantially all of said second plurality of rays; and;

recycling a portion of said plurality of rays of light back to said light source; and re-emitting said portion of said plurality of rays of light to said optical recycling device by said light source, thereby increasing the brightness of said light source's output.

7. The method of claim 6, wherein said optical recycling device is a spatial recycling device; and wherein the step of recycling comprises the step of spatially recycling said portion of said plurality of rays of light by reflecting said portion of said plurality of rays of light back to said light source.

8. The method of claim 7, wherein the step of spatially recycling comprises the step of reflecting said second plurality of rays of light back to said light source, thereby providing both spatial and angular recycling of light.

9. The method of claim 7, wherein said light source is a plurality of colored LED chips; and further comprising the steps of receiving said plurality of rays of light having different wavelength from said plurality of colored LED chips and combining said plurality of rays of light from said plurality of colored LED chips.

10. An illumination system for increasing the brightness of a light source, comprising:

a light source for emitting a plurality of rays of light generally about an axis, wherein a first plurality of said rays are emitted within a low angle range relative to said axis, and wherein a second plurality of said rays are emitted within a higher angle range up to 90 degrees relative to said axis; and an optical recycling device coupled to said light source for receiving substantially all of said plurality of rays of light from said light source;

wherein said recycling device has an annular opening, centered on said axis, for transmitting only said first plurality of said rays, and an annular, concave reflective portion having a reflective surface surrounding said axis, said concave portion extending axially from said opening towards said light source a sufficient distance to capture substantially all of said second plurality of rays and redirect said second plurality of rays of light back to said light source which re-emits said portion of said plurality of rays of light to said optical recycling device, thereby increasing the brightness of said light source's output, wherein said concave portion forms a dual paraboloid reflector to reflect said second plurality of rays of light once toward an opposing surface of said dual paraboloid reflector, from where it is focused back onto said light source.

* * * * *